US012782654B2

(12) United States Patent
Baudot et al.

(10) Patent No.: US 12,782,654 B2
(45) Date of Patent: Nov. 3, 2026

(54) MANAGING CO-PACKAGING OF PHOTONIC INTEGRATED CIRCUITS

(71) Applicant: Ciena Corporation, Hanover, MD (US)

(72) Inventors: Charles Baudot, Quebec (CA); Raphael Beaupré-Laflamme, Quebec (CA); François Pelletier, Quebec (CA); Simon Savard, Quebec (CA)

(73) Assignee: Ciena Corporation, Hanover, MD (US)

( * ) Notice: Subject to any disclaimer, the term of this patent is extended or adjusted under 35 U.S.C. 154(b) by 462 days.

(21) Appl. No.: 18/473,430

(22) Filed: Sep. 25, 2023

(65) Prior Publication Data

US 2025/0102751 A1 Mar. 27, 2025

(51) Int. Cl.
*G02B 6/42* (2006.01)

(52) U.S. Cl.
CPC ......... *G02B 6/4228* (2013.01); *G02B 6/4245* (2013.01); *G02B 6/4212* (2013.01); *G02B 6/4231* (2013.01); *G02B 6/4291* (2013.01); *G02B 6/4295* (2013.01)

(58) Field of Classification Search
None
See application file for complete search history.

(56) References Cited

U.S. PATENT DOCUMENTS 10,775,559 B2 9/2020 Watts et al.
11,686,906 B1 * 6/2023 Venkatesan .......... G02B 6/4238 385/93
11,693,196 B2 7/2023 Vermeulen et al.
2009/0087155 A1 * 4/2009 Watanabe ............ G02B 6/4219 385/131

(Continued)

FOREIGN PATENT DOCUMENTS

EP 1850157 B1 9/2009
JP 4796884 B2 10/2011

(Continued)

OTHER PUBLICATIONS

M. Theurer et al., "Flip-Chip Integration of InP and SiN," in IEEE Photonics Technology Letters, vol. 31, No. 3, pp. 273-276, Feb. 1, 2019, doi: 10.1109/LPT.2019.2892851.

(Continued)

*Primary Examiner* — Jerry Rahll

(74) *Attorney, Agent, or Firm* — Young Basile Hanlon & MacFarlane, P.C.

(57) ABSTRACT

A first photonic integrated circuit (PIC) comprises a first optical element optically coupled to a first coupling region at an edge of the first PIC. A second PIC is formed in part from a multilayer structure comprising a bottom layer, a top layer comprising a first material with a first index of refraction, and a middle layer comprising a second material with a second lower index of refraction and having a first thickness between the bottom and top layers. The second PIC comprises a plurality of vertical alignment pedestals comprising a portion of the middle layer having the first thickness and attached to at least a portion of the bottom layer, a plurality of thinned regions, and a second optical element optically coupled to a second coupling region at an edge of the second PIC. Two or more of the vertical alignment pedestals are adhered to the first PIC.

20 Claims, 21 Drawing Sheets

(56) References Cited

U.S. PATENT DOCUMENTS

| | | | | |
|---|---|---|---|---|
| 2011/0085760 | A1* | 4/2011 | Han | G02B 6/136 385/14 |
| 2015/0097210 | A1 | 4/2015 | Krasulick et al. | |
| 2016/0252688 | A1* | 9/2016 | Barwicz | G02B 6/4232 385/14 |
| 2016/0291265 | A1 | 10/2016 | Kinghorn et al. | |
| 2017/0237229 | A1 | 8/2017 | Menezo | |
| 2018/0180826 | A1* | 6/2018 | Merget | G02B 6/136 |
| 2020/0278506 | A1 | 9/2020 | Aalto et al. | |

FOREIGN PATENT DOCUMENTS

| | | | |
|---|---|---|---|
| WO | 2014101780 | A1 | 7/2014 |
| WO | 2015111600 | A1 | 7/2015 |

OTHER PUBLICATIONS

Van Gurp Johan Frederik Cornelis et al., "Passive Photonic Alignment with Submicrometer Repeatability and Accuracy", IEEE Transacting on Components, Packaging and Manufacturing Technology, IEEE, USA, vol. 3, No. 11, pp. 1971-1979, Nov. 1, 2013, ISSN: 2156-3950, DOI: 10.1109/TCPMT.2013.2272419.

* cited by examiner

MANAGING CO-PACKAGING OF PHOTONIC INTEGRATED CIRCUITS

TECHNICAL FIELD

This disclosure relates to managing co-packaging of photonic integrated circuits.

BACKGROUND

There can be several advantages in developing electro-optical circuits on a silicon photonic (SiPhot) platform. Among others, such advantages can include: (1) yield, robustness, reliability associated with the complementary metal-oxide-semiconductor (CMOS) platform fabrication knowledge, which was developed over decades for electronics, (2) co-integration of various optical functions bearing a small footprint within the same die, and (3) cost of production due to the large volume manufacturing business model of CMOS technologies. Various derivative technologies have been developed to take advantage of CMOS know-how, including micro-electromechanical systems (MEMS) and imaging technologies which are widely used in smartphones, watches, and numerous other applications.

SUMMARY

In one aspect, in general, an apparatus comprises: a first photonic integrated circuit comprising a first optical element optically coupled to a first coupling region at an edge of the first photonic integrated circuit; a second photonic integrated circuit, formed in part from a multilayer structure comprising (1) a bottom layer, (2) a top layer comprising a first material with a first index of refraction, and (3) a middle layer comprising a second material with a second index of refraction lower than the first index of refraction and having a first thickness between the bottom and top layers, the second photonic integrated circuit comprising a plurality of vertical alignment pedestals comprising a portion of the middle layer having the first thickness and attached to at least a portion of the bottom layer, a plurality of thinned regions, at least one of which is located between two of the plurality of vertical alignment pedestals, in which at least a portion of the middle layer is absent or has a thickness less than the first thickness, and a second optical element optically coupled to a second coupling region at an edge of the second photonic integrated circuit. Two or more of the plurality of vertical alignment pedestals are adhered to the first photonic integrated circuit.

Aspects can include one or more of the following features.

The first and second coupling region are optically coupled and vertically offset from one another by less than 40 nanometers.

The first optical element comprises an optical waveguide, and the first coupling region comprises a portion of the optical waveguide that is in proximity to the edge of the first photonic integrated circuit.

The second optical element comprises an optical spot size converter, and the second coupling region comprises a portion of the optical spot size converter that is in proximity to the edge of the second photonic integrated circuit.

The second optical element is optically coupled to one or more photodiode modules located in the second photonic integrated circuit, each photodiode module comprising one or more photodiodes.

At least one of the one or more photodiode modules comprise a first photodiode optically coupled to a third optical element and a second photodiode optically coupled to a fourth optical element, where the third optical element and the fourth optical element are separated by a first distance.

The first photodiode and the second photodiode are electrically connected in parallel.

The third optical element is optically coupled to a fifth optical element, and the fourth optical element is optically coupled to a sixth optical element, where the fifth optical element and the sixth optical element are separated by a second distance that is different from the first distance.

The fifth optical element and the sixth optical element are optically coupled to a seventh optical element, and where the seventh optical element is optically couple to the second optical element.

At least one of the one or more photodiode modules is electrically connected to a metal layer located under the bottom layer.

At least one of the one or more photodiode modules is electrically connected to a metal layer located on top of the top layer.

The first photonic integrated circuit and the second photonic integrated circuit are electrically connected.

The first photonic integrated circuit comprises a first set of tapered guiding structures and the second photonic integrated circuit comprises a second set of tapered guiding structures, and a portion of the second set of tapered guiding structures is located within the first set of tapered guiding structures.

The top layer comprises silicon, indium phosphide, thin film lithium niobate, or silicon nitride.

The middle layer comprises an oxide or a buried oxide.

In another aspect, in general, a method comprises: forming a first photonic integrated circuit comprising a first optical element optically coupled to a first coupling region at an edge of the first photonic integrated circuit; forming a second photonic integrated circuit, including portions formed in part from a multilayer structure comprising (1) a bottom layer, (2) a top layer comprising a first material with a first index of refraction, and (3) a middle layer comprising a second material with a second index of refraction lower than the first index of refraction and having a first thickness between the bottom and top layers, the second photonic integrated circuit comprising a plurality of vertical alignment pedestals comprising a portion of the middle layer attached to at least a portion of the bottom layer, a plurality of thinned regions, at least one of which is located between two of the plurality of vertical alignment pedestals, in which at least a portion of the middle layer is absent or has a thickness less than the first thickness, wherein forming the plurality of thinned regions comprises selectively etching such that oxide is etched faster than silicon is etched, and a second optical element optically coupled to a second coupling region at an edge of the second photonic integrated circuit; and adhering two or more of the plurality of vertical alignment pedestals to the first photonic integrated circuit.

Aspects can include one or more of the following features.

Forming the plurality of thinned regions comprises patterning a portion of the top layer to remove portions of the top layer that were over the plurality of thinned regions, and selectively etching such that oxide of the middle layer is etched faster than silicon of the top layer remaining on the plurality of vertical alignment pedestals is etched.

The method further comprises inserting a portion of a first set of tapered guiding structures of the second photonic integrated circuit into a second set of tapered guiding structures of the first photonic integrated circuit.

The second optical element is optically coupled to one or more photodiode modules located in the second photonic integrated circuit, each photodiode module comprising one or more photodiodes.

The first photonic integrated circuit and the second photonic integrated circuit are electrically connected.

Aspects can have one or more of the following advantages.

The subject matter disclosed herein provides means for the co-packaging of one or more companion chips to a host chip. Such co-packaging allows for vertically stacking photonic chips and for both electrical and optical interconnections between the stacked photonic chaps. The companion chips can have single channel or multi-channel electro-optical subsystems which can be fabricated at large scale and are compatible with various photonic host chip modules. The companion chips can enable high density, low footprint designs with the capability for integration in the middle of a host chip. In general, the companion chips comprise a multilayer structure comprising (1) a bottom layer (e.g., a handle), (2) a top layer comprising a first material with a first index of refraction (e.g., silicon, indium phosphide (InP), thin film lithium niobate (TFLN), or silicon nitride (SiN)), and (3) a middle layer comprising a second material with a second index of refraction lower than the first index of refraction (e.g., an oxide or buried oxide, such as silicon dioxide). The fabrication of the companion chips can utilize a silicon-on-insulator layer, InP layer, TFLN layer, SiN layer, or other layers in a multilayer structure as an etch-stop layer to generate alignment pedestals that have small vertical tolerances and thereby assist in passive vertical optical alignment with the host chip. Alterations that depend on the exact platform utilized may be beneficial, but the overall implementation may be similar. Forming the alignment pedestals can also groove the oxide of the die to reduce the amount of contact surface with the host chip, in some examples. The high accuracy with which the etch-stop layer can be fabricated provides enhanced precision in the height of the alignment pedestals. Furthermore, the extended frame section of the substrate (e.g., a silicon handle of the companion chip) can be utilized as a holder during flip-chip assembly.

In some examples, electrical contacts on the companion chip can be routed to the backside (e.g., under a silicon handle) by using through silicon vias (TSVs) and metal redistribution layers (RDL), thus allowing for electrical pads to be located on a mechanically stable section of the backside of the companion chip. To assist with passive horizontal optical alignment between the host chip and the companion chip, the companion chip can be patterned with oxide combs and the host chip can be etched with trenches. Thus, the combs and the trenches can fit together to lock the relative horizontal positioning of the chips. Since the aforementioned fabrication processes can be performed at the wafer level, they are also convenient to perform in a wafer level assembly process flow.

By using a well-controlled platform various additional elements can be integrated into the companion chip, such as optical filtering elements, electrical noise filtering, electrostatic discharge protections, mixing signals, and RF tuning features. Such elements may be challenging or impossible to integrate with conventional external monitoring photodiodes (MPDs).

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
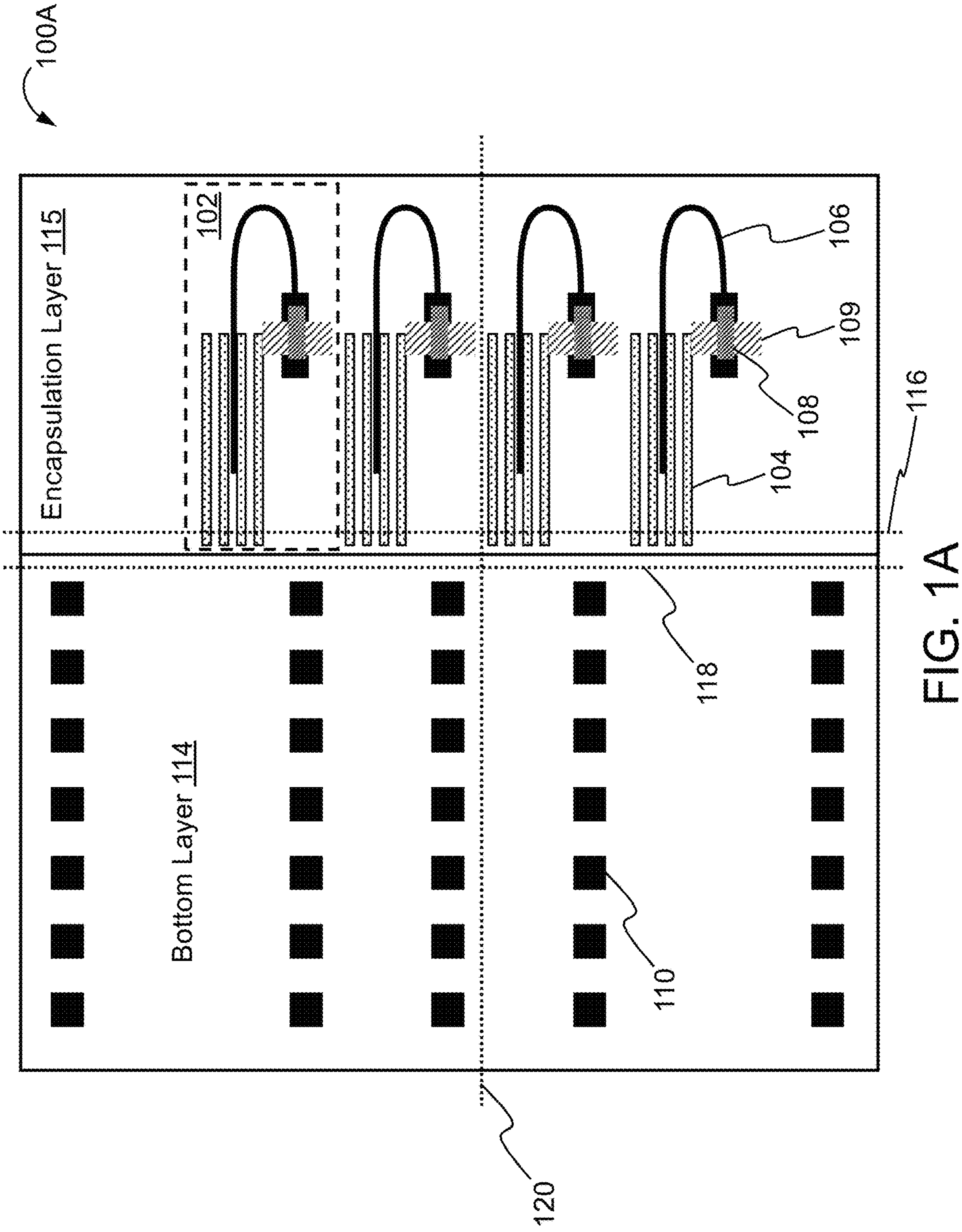
FIG. 1A is a schematic diagram of a multi-port optical monitoring companion chip, as viewed from above.

Despite its many advantages, the silicon photonic (SiPhot) platform still retains some limitations associated with its fundamental structure. Since SiPhot is based on a CMOS model, where high yield may be critical, SiPhot may consequently be oriented towards using a restricted set of materials and fabrication methods which are highly predictable so as to ensure very high control levels during every fabrication step. Derogating from high levels of control may consequently result in poor yield and poor repeatability, and would correspond to exploiting silicon as a material and not as a technology platform. Therefore, introducing new fabrication methods and materials in a CMOS platform may be a long and difficult process.

Some applications, such as photonics, may utilize and benefit from a variety of materials that are associated with specific or unique optical and/or electro-optical functions. Thus, new material exploration, development, and exploitation can be important aspects of photonics that may seem incompatible with the standard SiPhot CMOS model. In some examples, it may be beneficial to be able to take advantage of features from both CMOS development and new materials within a given photonic system.

Indeed, there are various non-silicon platforms used in photonics which offer noticeable advantages and instead make use of different materials, such as indium phosphide (InP), gallium arsenide, gallium nitride, lithium niobate, and barium titanate. Among such non-silicon platforms, some have features which enable the fabrication of both transmitters and receivers, while others are limited to the fabrication of transmitters. The limitation of the latter may occur because the material does not absorb light and thus cannot generate photoresponsivity. However, photoresponsivity can also play a role in transmitter modules, where it may be used to fabricate photodetection modules (e.g., photodiodes). Such photodetection modules may be implemented in an electro-optical transmitter circuit to monitor an optical signal at different circuit sections to ensure that the optical functions are under control. Consequently, external and discrete monitoring photodiodes (MPDs) may be used for platforms that lack photoresponsivity.

In some examples, a SiPhot device may consume more space than purely electrical CMOS technologies. For example, typical device dimensions for the SiPhot platform may be in the 10 μm to the 10 mm range. Thus, a SiPhot-based circuit footprint can be significantly larger than traditional field sizes used in CMOS technology. Consequently, complex stitching strategies may be needed to interconnect several neighboring fields so that the whole circuit can be generated. Thus, the ability to vertically stack a SiPhot circuit over various stories (i.e., layers), as if the circuit was folded many times on itself, may be beneficial for various reasons. For example, such stacking may reduce the overall signal path length and may reduce the circuit routing complexity. Furthermore, vertical stacking may also reduce the die footprint within the system. In general, reliable and low loss optical interconnections can be important factors for enabling vertical stacking of a photonic chip.

In some examples, the subject matter disclosed herein comprises (1) a companion chip formed from a multilayer structure and which is designed to be a single or multi-port integrated electro-optical subsystem and (2) a co-packaging strategy of the companion chip with a host chip (e.g., a photonic integrated circuit) to achieve passive optical alignment. In contrast to active optical alignment, which may use a photodiode signal associated with the optical coupling between two or more optical elements, passive optical alignment does not directly measure the optical coupling between two or more optical elements during the alignment process. Passive optical alignment may be faster to perform than active optical alignment but can be challenging to perform, for example, because a smaller tolerance may be required so as to ensure that alignment is achieved without further adjustments and without further measurements of the optical coupling during the alignment process.

In general, the companion chips comprise a multilayer structure comprising (1) a bottom layer (e.g., a handle), (2) a top layer comprising a first material with a first index of refraction (e.g., silicon, indium phosphide (InP), thin film lithium niobate (TFLN)), and (3) a middle layer comprising a second material with a second index of refraction lower than the first index of refraction (e.g., an oxide or buried oxide). The fabrication of the companion chips can utilize a silicon-on-insulator layer, InP layer, TFLN layer, or other layers in a multilayer structure as an etch-stop layer to generate alignment pedestals that have small vertical tolerances and thereby assist in passive vertical optical alignment with the host chip (e.g., first and second coupling region can be optically coupled and vertically offset from one another by less than 40 nanometers, as summarized above).

FIG. 1A shows a multi-port optical monitoring companion chip 100A, as viewed from above. In this example, each port 102 serves as an optical monitor such that an optical input from a host chip (not shown) is transformed into an electrical output. SSCs 104 (spot size converters) are laterally (also referred to as directly) optically coupled to each optical input that is to be monitored. The SSCs 104 are each coupled (e.g., evanescently) to respective waveguides 106 comprising silicon that can rout the optical signal to various signal processing functions, such as noise filtering devices, polarization selective filters, stray light absorbers, or higher order mode filtering (not shown). The optical signals are then coupled from the waveguides 106 to respective photodiodes 108, thereby generating an electrical signal that can transmitted along metallization layers 109 (e.g., comprising one or more metallic layers that are vertically separated and electrically connected by metallic vias). The metallization layers 109 are electrically connected to the photodiode 108 and may be routed off the multi-port optical monitoring companion chip 100A by various means (not shown). Alignment pedestals 110, comprising (1) a top silicon layer (not shown) that can be the same material as the waveguides 106 and (2) a buried oxide layer (not shown), are formed on top of a bottom layer 114 (e.g., a silicon handle). The SSCs 104, the waveguides 106, the photodiodes 108, and the metallization layers 109 are embedded within an encapsulation layer 115 (e.g., an oxide layer). A first dashed line 116, a second dashed line 118, and a third dashed line 120 denote cross-sections (i.e., planes) formed out of the page for FIGS. 1B, 1C, and 1D, respectively.

Referring again to FIG. 1A, in general, the multi-port optical monitoring companion chip 100A can instead be fabricated from other multilayer structures (e.g., comprising InP or TFLN). In such cases, the waveguides 106 may comprise InP or TFLN, for example, and the alignment pedestals 110 may comprise (1) a top layer (not shown) that can be the same material as the waveguides 106 and (2) a middle layer (not shown) formed on top of a bottom layer (e.g., the bottom layer 114). In some examples, the top layer and the bottom layer may comprise the same material. The top layer has a higher index of refraction than the middle layer such that the two layers collectively form a waveguide structure comprising a core (top layer) and a cladding (middle layer).

Figure 1B:
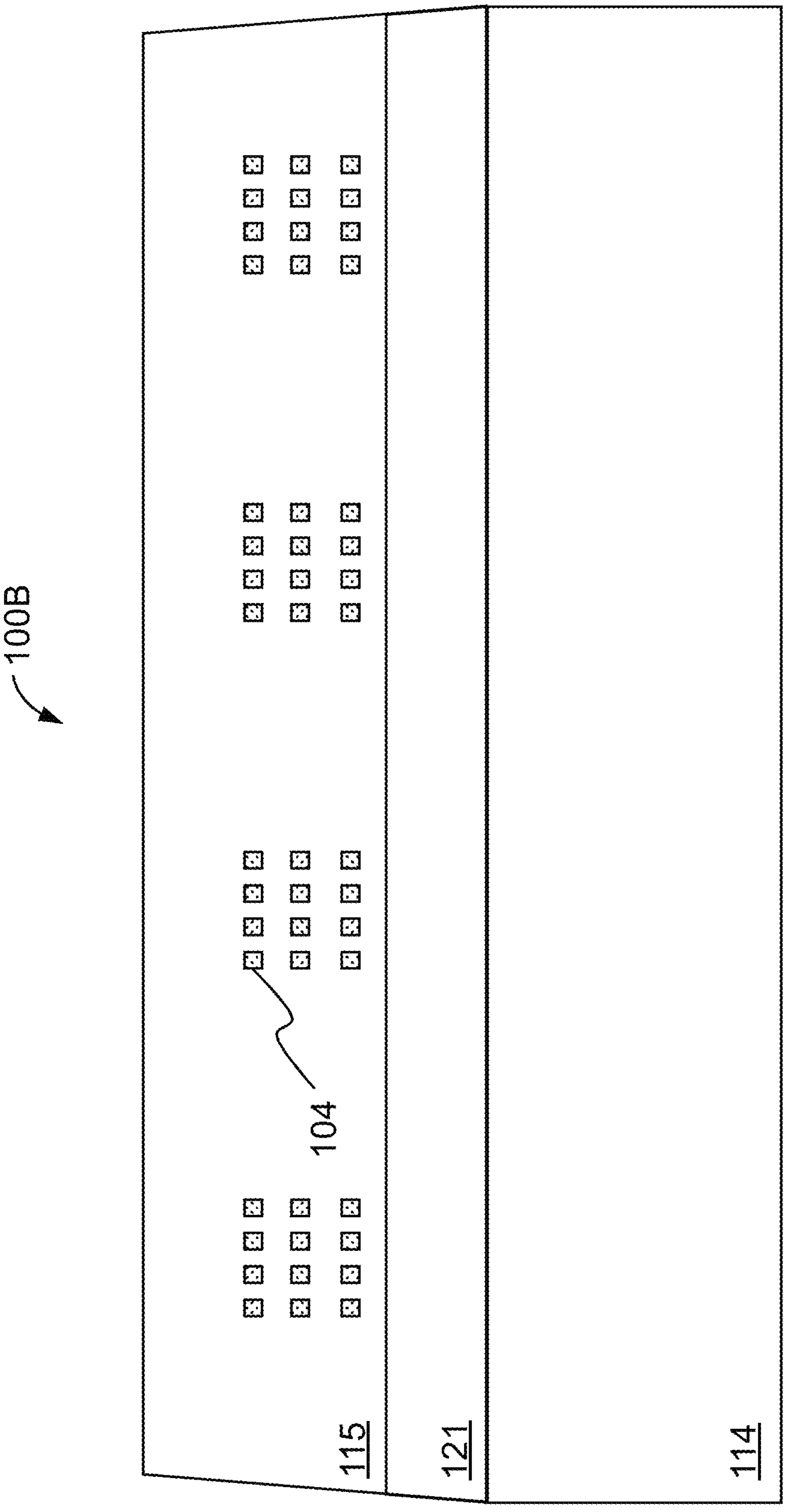
FIG. 1B is a schematic diagram of a cross-section of a multi-port optical monitoring companion chip.

FIG. 1B shows a cross-section of a multi-port optical monitoring companion chip 100B, as viewed through a plane denoted by the first dashed line 116 of FIG. 1A. SSCs 104 are formed within an encapsulation layer 115 that is located on top of a buried oxide layer 121. The buried oxide layer 121 is located on top of a bottom layer 114. In some examples, the capsulation layer 115 and the buried oxide layer 121 can be the same material (e.g., silicon dioxide).

Although a silicon-on-insulator platform is shown in FIG. 1B, other multilayer structures (e.g., comprising InP or TFLN) may also be used.

Figure 1C:
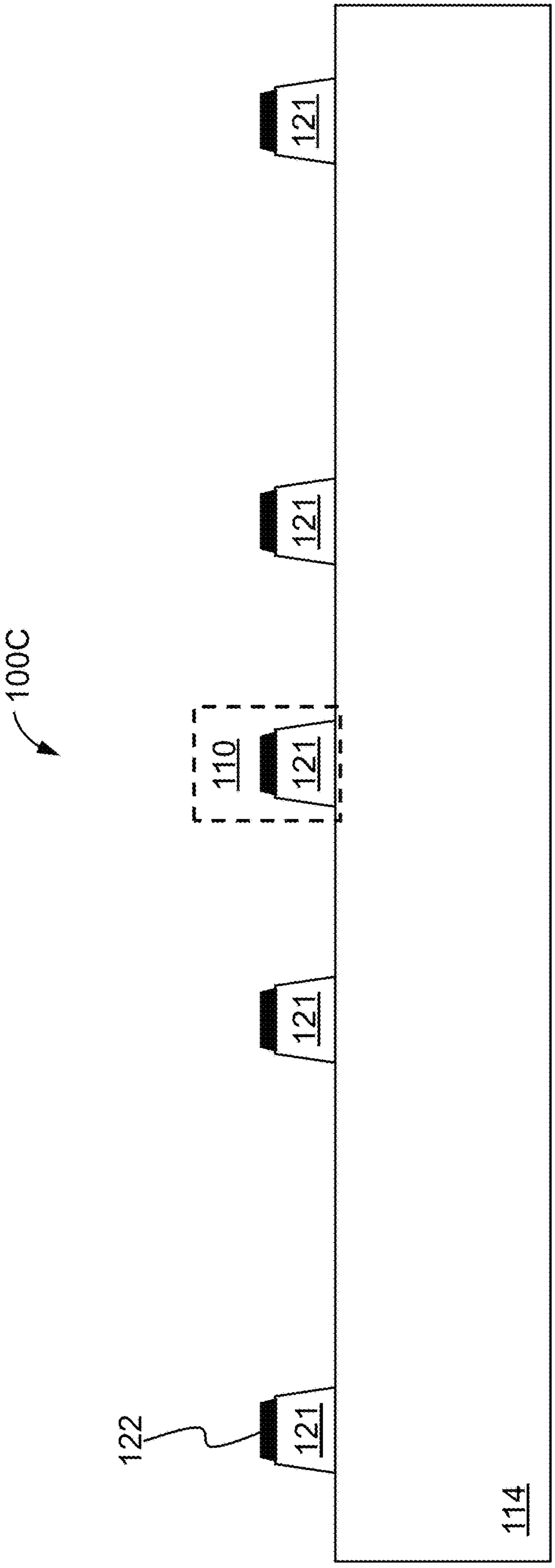
FIG. 1C is a schematic diagram of a cross-section of a multi-port optical monitoring companion chip.

FIG. 1C shows a cross-section of a multi-port optical monitoring companion chip 100C, as viewed through a plane denoted by the second dashed line 118 of FIG. 1A. Alignment pedestals 110 comprising a buried oxide layer 121 and a top layer 122 (e.g., silicon, InP, TFLN, or SiN) are formed on top of a bottom layer 114 (e.g., silicon, InP, TFLN, or SiN). Although a silicon-on-insulator platform is shown in FIG. 1C, other multilayer structures (e.g., comprising InP or TFLN) may also be used. For example, the top layer 122 and/or the bottom layer 114 may instead comprise InP or TFLN.

Figure 1D:
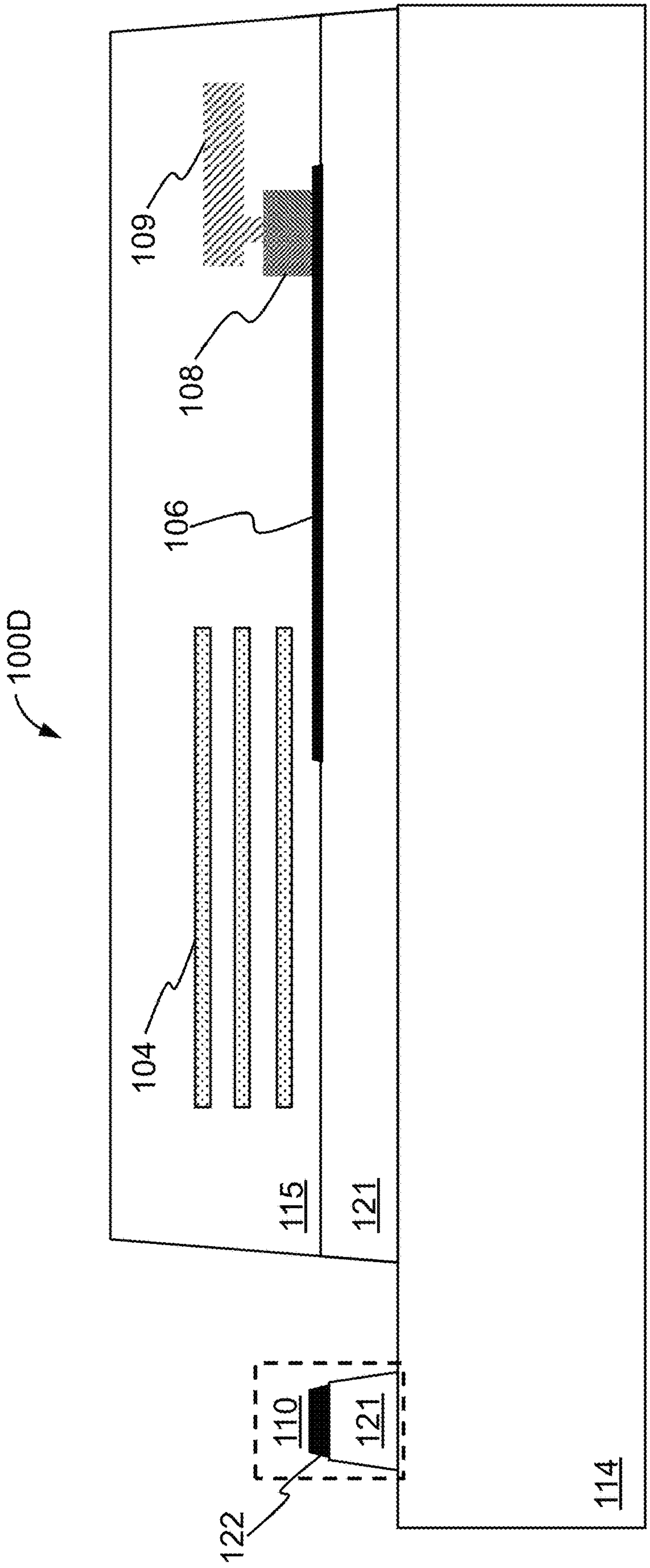
FIG. 1D is a schematic diagram of a cross-section of a multi-port optical monitoring companion chip.

FIG. 1D shows a cross-section of a multi-port optical monitoring companion chip 100D, as viewed through a plane denoted by the third dashed line 120 of FIG. 1A. SSCs 104 are formed within an encapsulation layer 115 that is located on top of a buried oxide layer 121. The buried oxide layer 121 is located on top of a bottom layer 114. The SSCs 104 are evanescently coupled to a waveguide 106 that is optically coupled to a photodiode 108 (e.g., comprising one or more layers of germanium). Metallization layers 109 are electrically connected to the photodiode 108 and may be routed off the multi-port optical monitoring companion chip 100D by various means (not shown). Alignment pedestals 110 comprising the buried oxide layer 121 and a top layer 122 are formed on top of the bottom layer 114.

In general, each port of the companion chip may comprise a set of one or more devices to generate an electro-optic function. For example, each port may act as an optical monitor such that an optical input is transformed into an electrical output. During the fabrication of the companion chip, some devices or structures may be fabricated concurrently to one another. In general, a bare SiPhot wafer comprises an oxide layer, referred to as the BOX layer (buried oxide layer). The BOX layer may be 1 to 4 μm thick, typically 3 μm, on top of which there is a top silicon layer that can be referred to as a SOI layer (silicon-on-insulator layer), which may be 150 to 500 nm thick, typically 220 nm. Below the BOX layer is a bottom silicon layer that can be referred to as the substrate or the handle. The SOI layer can be patterned such that waveguides and passive optical devices are fabricated in silicon and constitute the electro-optical devices of the companion chip. Concurrently, a slab section can also be patterned and utilized as a seed layer (e.g., for photodiode integration). In some examples, photodiodes may comprise one or more photosensitive germanium layers that are grown during a subsequent step (e.g., by selective epitaxy on the slab section). During the SOI patterning step, silicon-on-insulator structures are formed at one or more locations around the electro-optic circuit that will subsequently be used to generate alignment pedestals for passive optical alignment. In general, similar fabrication techniques may also be applied to fabrication from other multilayer structures (e.g., comprising InP and TFLN).

Various steps and processes may be used to fabricate other structures and devices on the companion chip. For example, during the fabrication of the companion chip, processes to deposit and pattern SiN may be utilized to generate a spot size converter (SSC) comprising one or more core structures and one or more cladding structures for collectively guiding one or more optical modes. The position of the SiN layers may depend on the optical port target in terms of mode diameter and latitude and may be adjusted to achieve certain specifications. Also, during the fabrication of the companion chip, silicon dioxide ($SiO_2$) may be deposited as an inter-layer and encapsulation dielectric (e.g., between two SiN layers or between to metallization layers). After the fabrication of the electrical and photonic devices, some or all of the devices can be fully embedded within a deposited oxide matrix.

After encapsulating the devices in the deposited oxide matrix, an additional patterning step can be utilized to assist dicing of the photonic integrated circuit into its own die. During the patterning step, a frame with a diameter of approximately 50 μm to 300 μm, typically 200 μm, may be etched into the oxide matrix around the companion chip. The etching recipe used for the dicing patterning step may be designed to be highly selective between silicon and oxide, such that oxide is etched substantially faster than silicon. Moreover, the etching recipe may also be anisotropic, such that steep vertical walls (e.g., with an angle of less than 10 degrees) are obtained. The oxide etching thus etches both encapsulation oxide and buried oxide (i.e., the BOX layer), and effectively stops at a layer of silicon (e.g., the silicon handle or the patterned SOI layer) if a SOI platform is being used. In other multilayer structure examples, the oxide etching may effectively stop at a top layer of the multilayer structure (e.g., comprising patterned silicon, InP, or TFLN).

Consequently, without the pedestal-forming structures formed from a multilayer structure, an oxide trench would be generated around the entire portion of the photonic integrated circuit not covered in an etch-stop material. However, the specificity of the oxide etching step is such that alignment pedestals are formed within the oxide trench due to the patterned structures behaving like masking etch-stop layers that block the BOX layer from being etched when located under the top layer. In some examples, the alignment pedestals can be fabricated by etching the oxide layer of a companion chip that is patterned with SiN. The SiN layer acts as an etch stop, making a protective shadow against etching under itself. As the SiN layer is made using lithographic processes, its depth is well controlled at the sub-micron scale.

In general, there are several options for electrical routing of the companion chip to the host chip. For example, the electrical routing may use back-side integration (i.e., beneath the bottom layer) using vias or through silicon vias (TSVs), in conjunction with redistribution layers (RDLs). Front-side routing (i.e., on top of the chip) may also be achieved by using RDL and metal lines. Independent of the selected metallization scheme, the last process step of the companion chip may comprise dicing the companion chip at the patterned outer-frame extremity to obtain dies.

Once the companion chip is fabricated, the attachment with the host chip, also referred to as co-packaging, comprises flipping the companion chip and utilizing its alignment pedestals to position it at the correct height with respect to an optical coupling region at an edge of the host chip. Prior positioning the companion chip, an index matching adhesive may be applied at some or all of the interfaces between the companion and host chips. Thus, when the companion chip is adhered to the host chip, the alignment pedestals of the companion chip press into the adhesive and may stop at a surface of the host chip. Once the adhesive is cured, the vertical position of the companion chip with respect to the host chip is fixed. The vertical position can be very accurately determined because it depends on the precision with which the alignment pedestals are fabricated, which can be of sufficient precision so as to allow for high optical coupling efficiency between the companion chip and host chip (e.g., tens of nanometers).

Figure 2A:
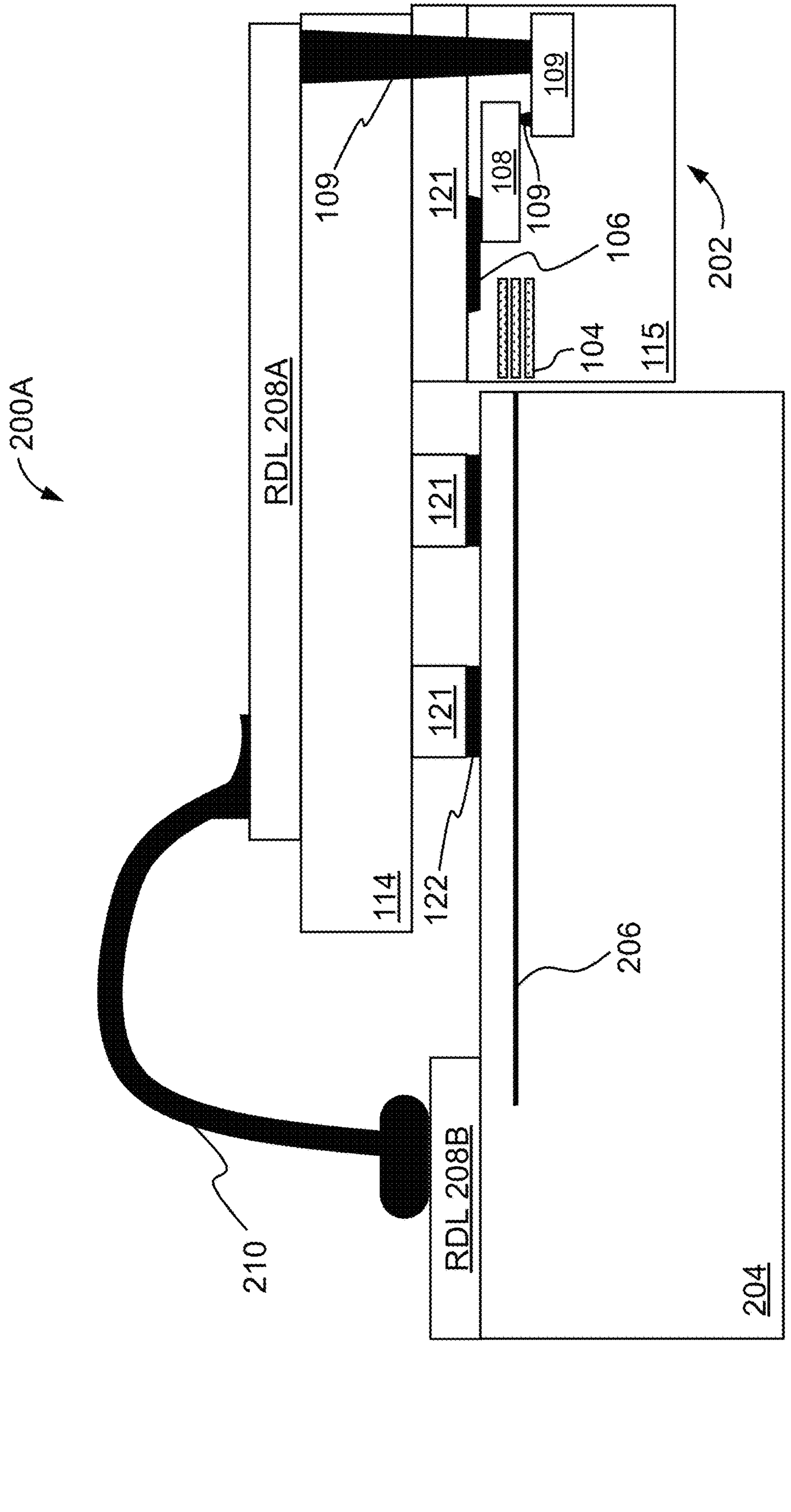
FIG. 2A is a schematic diagram of a cross-section, as viewed from the side, of a co-packaged photonic integrated circuit.

FIG. 2A shows a cross-section, as viewed from the side, of a co-packaged photonic integrated circuit 200A comprising (1) a multi-port optical monitoring companion chip 202 and (2) a host chip 204. The host chip 204 comprises a host waveguide 206 that is optically coupled to SSC 104 of the companion chip 202. A waveguide 106 optically couples the SSCs 104 to a photodiode 108 that is electrically coupled by metallization layers 109 to a first redistribution layer 208A located on the backside of the companion chip 202. The first redistribution layer 208A is electrically connected to a second redistribution layer 208B by a wire bond 210. The second redistribution layer 208B may then rout the electrical signal elsewhere on the host chip 204 or to other companion chips (not shown). The optical facets of the host chip 204 and companion chip 202 (i.e., the regions where the host waveguide 206 approaches the edge of the host chip 204 and where the SSC 104 approaches the edge of the companion chip 202) can be placed in close proximity (e.g., separated by a distance less than 5 μm). Such an arrangement, in conjunction with a small mode field diameter (i.e., the "working" diameter of the optical beam), on the order of 10 μm, can reduce the amount of stray light that scatters to undesired portions of the photonic circuit.

Figure 2B:
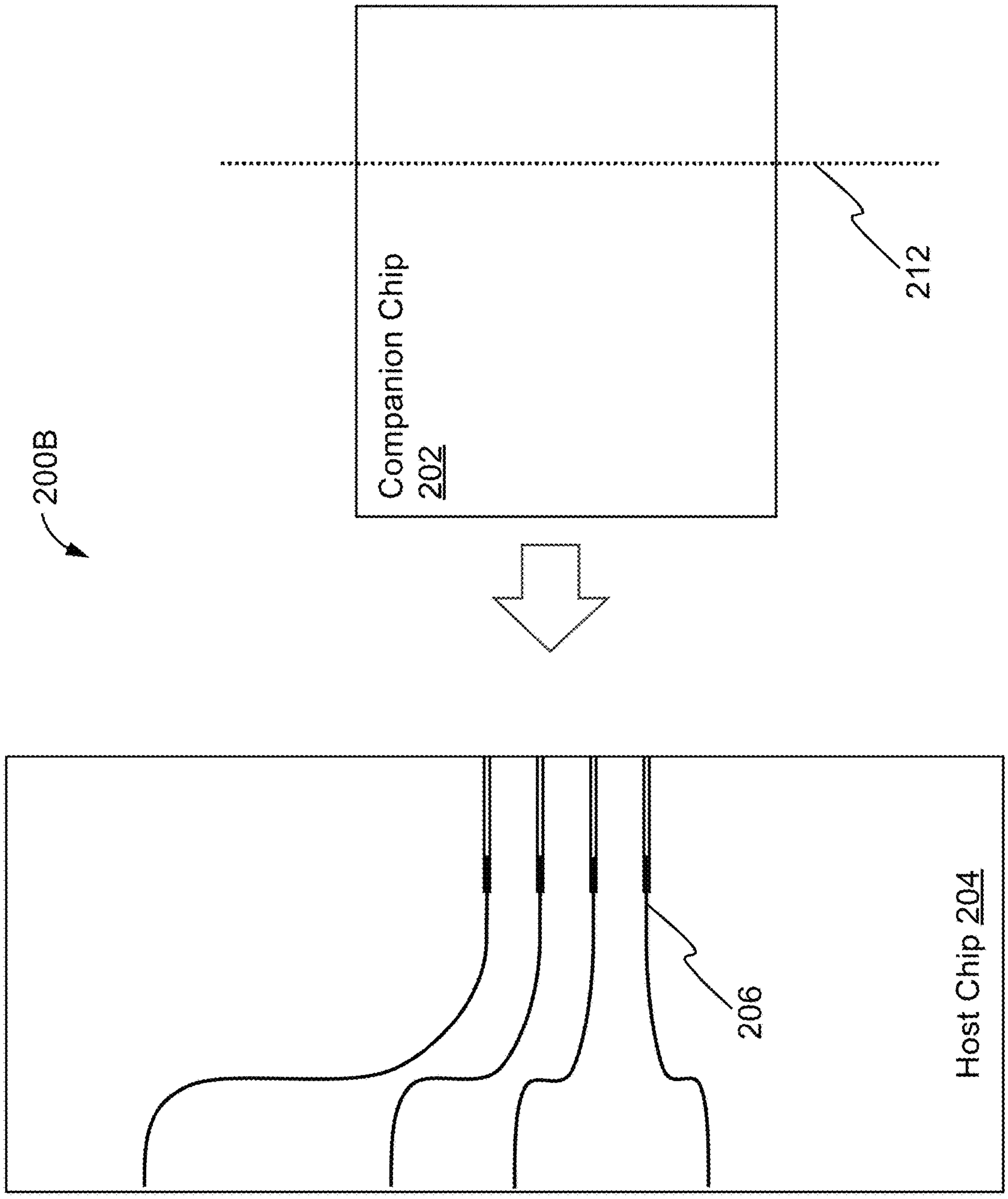
FIG. 2B is a schematic diagram of a co-packaging assembly process, as viewed from above.

FIG. 2B shows a co-packaging assembly process 200B, as viewed from above. A companion chip 202 is in the process of being adhered to a host chip 204 such that host waveguides 206 on the host chip 204 align with waveguides (not shown) on the companion chip 202. The waveguides of the companion chip 202 may be SSCs in some examples. A dashed line 212 denotes a cross-section (i.e., plane) formed out of the page for FIG. 2C.

Figure 2C:
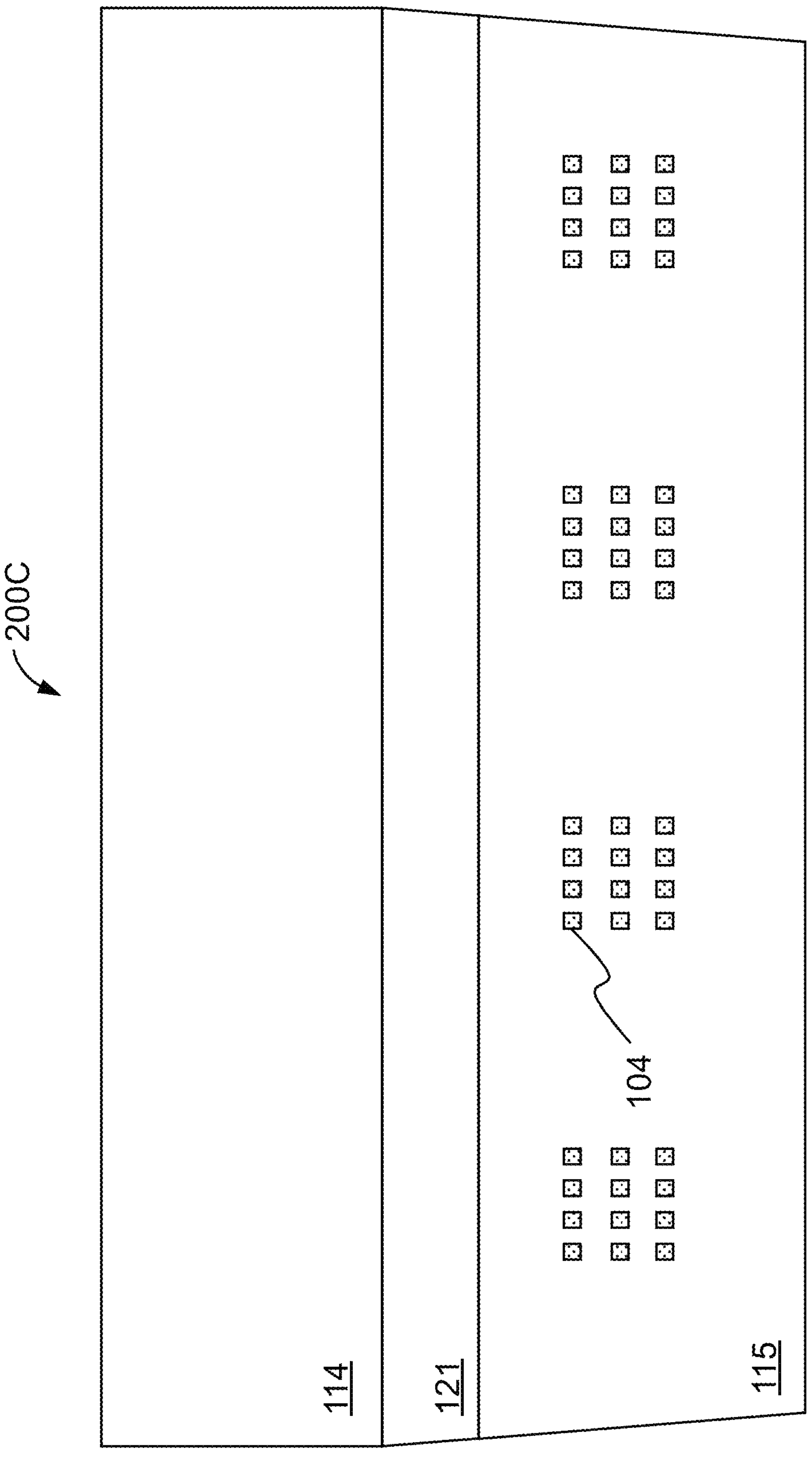
FIG. 2C is a schematic diagram of a cross-section of a companion chip.

FIG. 2C shows a cross-section, as viewed through a plane denoted by the dashed line 212 of FIG. 2B, of a companion chip 200C. The companion chip 200C has been "flipped" after the fabrication process so that it can be co-packaged with a host chip (not shown).

In general, the companion chips can be small compared to external, discrete electro-optical devices, as they utilize integrated photonic platforms. Typical silicon photonic photodiodes are just tens of microns wide and long, so a series of photodiodes, including SSCs and filtering elements, can be located within a several hundred micron square area of the host chip. In some examples, this footprint is not substantially larger than if the companion chip functionality was directly integrated within the host chip. The waveguides of the companion chip can be fabricated using a photolithographic process, so that the pitch (e.g., of a 1×2 waveguide) can be controlled at the sub-micron scale.

In some examples, the companion chip can also be attached inside a cavity of the host chip instead of at the outer edge of the host chip. Auto-alignment features can be built into the host and companion chips, for example, by selectively etching the oxide. This etching can create a positive and negative matching pattern and allows for various auto-alignment schemes.

Figure 3A:
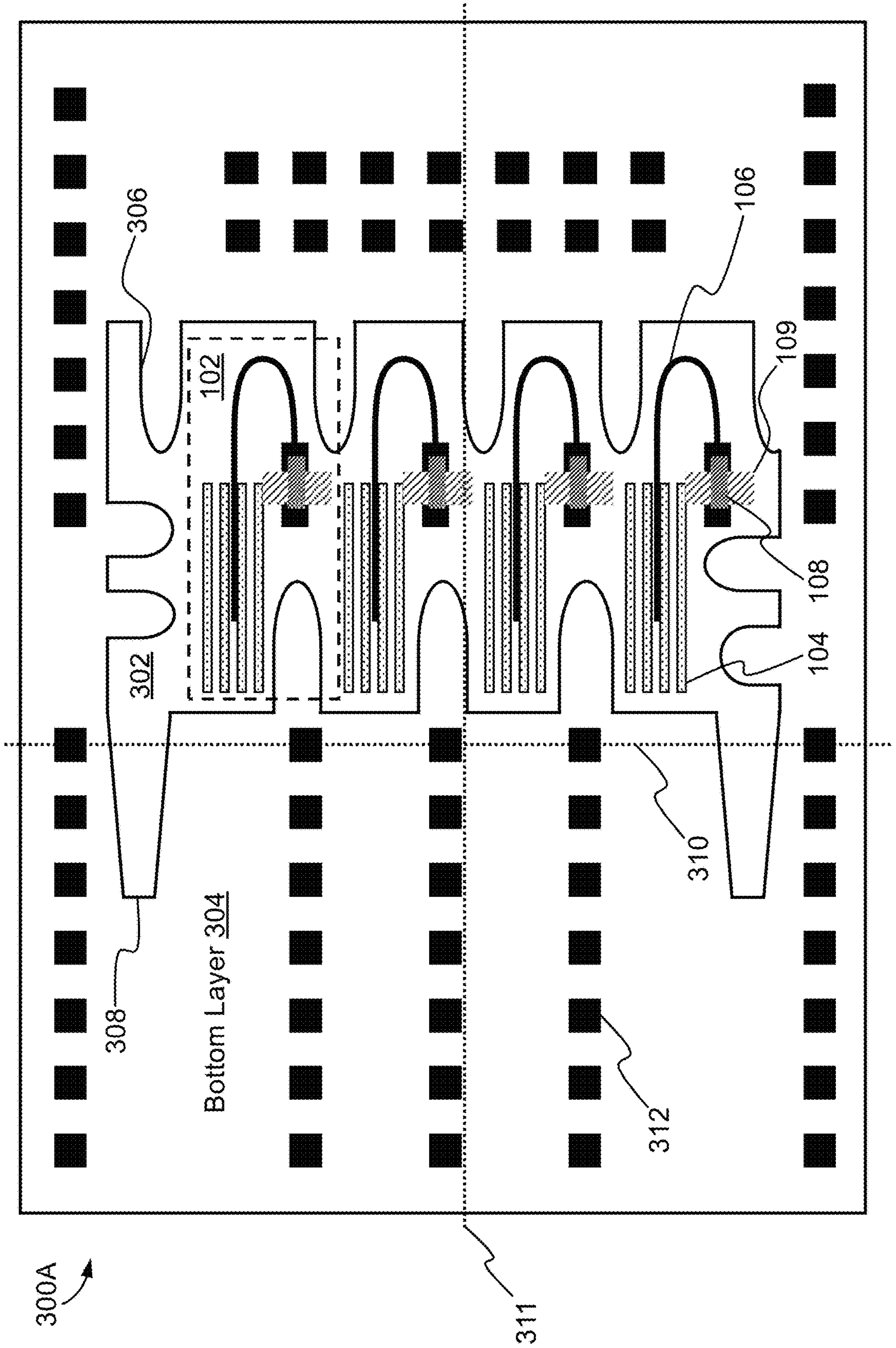
FIG. 3A is a schematic diagram of a multi-port optical monitoring companion chip, as viewed from above.

FIG. 3A shows a multi-port optical monitoring companion chip 300A, as viewed from above. In this example, an oxide layer 302 (e.g., comprising encapsulation oxide and buried oxide) is located on top of a bottom layer 304 and has several characteristics to assist with alignment and attachment to a host chip (not shown). In some locations, the oxide layer 302 is absent (e.g., removed by etching) to form adhesive cavities 306 that adhesive can enter into and provide additional surface area for adhesion to the host chip. Alignment guides 308 allow for the multi-port optical monitoring companion chip 300A to be inserted into one or more reciprocally shaped cavities or trenches on the host chip during attachment. The alignment guides 308 can enhance horizontal alignment by acting as a "key" for a reciprocal "lock" of the host chip. In general, the adhesive cavities 306 and the alignment guides 308 can vary in number, size, shape (e.g., tapered as shown in FIG. 3A, and as described above as "tapered guiding structures"), and location. A first dashed line 310 and a second dashed line 311 denote cross-sections (i.e., planes) formed out of the page for FIGS. 3B and 3C, respectively. In this example, the multi-port optical monitoring companion chip 300A can be inserted into a cavity of the host chip, rather than the edge of the host chip, and therefore comprises alignment pedestals 312 on both sides of the oxide layer 302 (i.e., the left and the right sides).

Figure 3B:
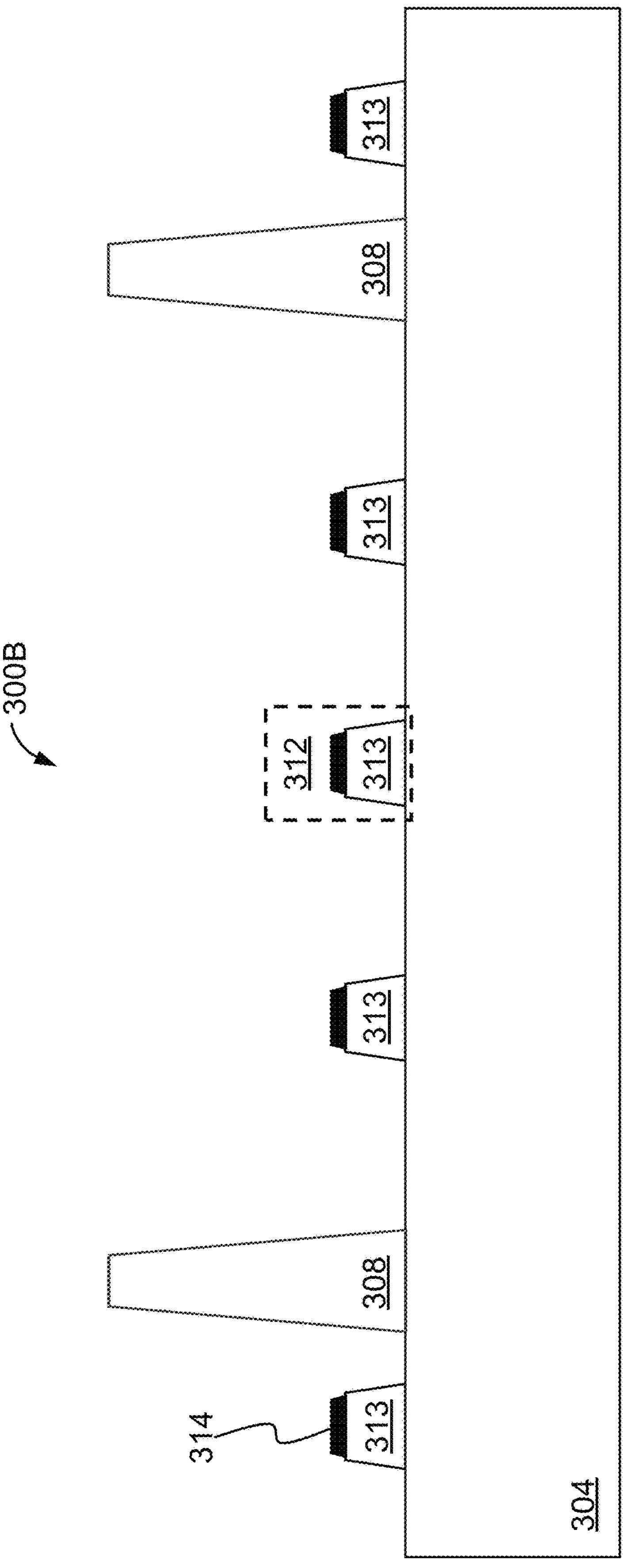
FIG. 3B is a schematic diagram of a cross-section of a multi-port optical monitoring companion chip.

FIG. 3B shows a cross-section of a multi-port optical monitoring companion chip 300B, as viewed through a plane denoted by the first dashed line 310 of FIG. 3A. Alignment pedestals 312 comprising a buried oxide layer 313 and a top layer 314 (e.g., silicon, InP, TFLN, or SiN) are formed on top of a bottom layer 304 (e.g., silicon, InP, TFLN, or SiN). Alignment guides 308 (e.g., composed of the buried oxide layer 313 and an encapsulation oxide) are also formed on top of the bottom layer 304.

Figure 3C:
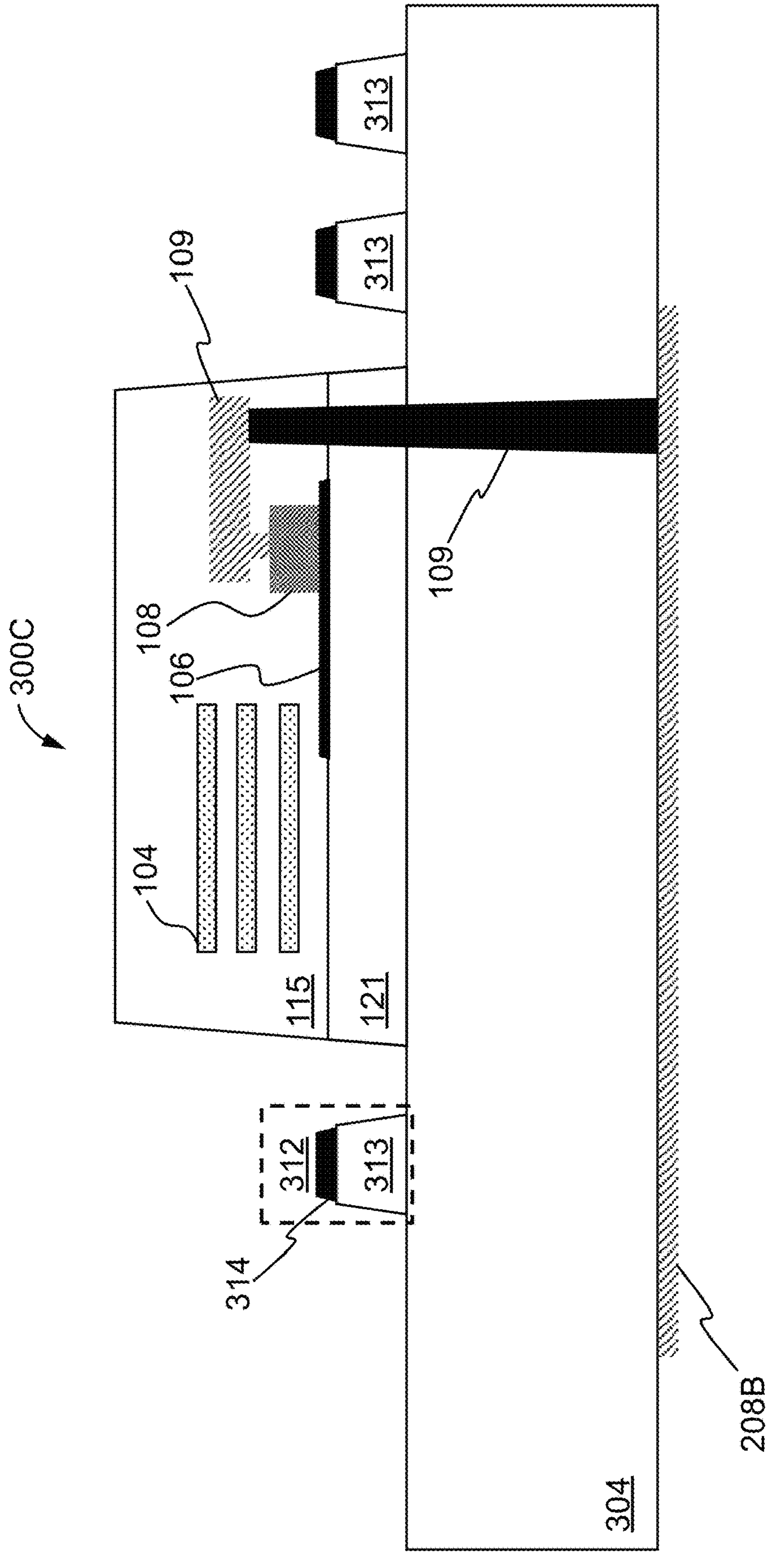
FIG. 3C is a schematic diagram of a cross-section of a multi-port optical monitoring companion chip.

FIG. 3C shows a cross-section of a multi-port optical monitoring companion chip 300C, as viewed through a plane denoted by the second dashed line 311 of FIG. 3A. In this example, metallization layers 109 are electrically connected to a photodiode 108 and to a bottom redistribution layer 208A.

Figure 3D:
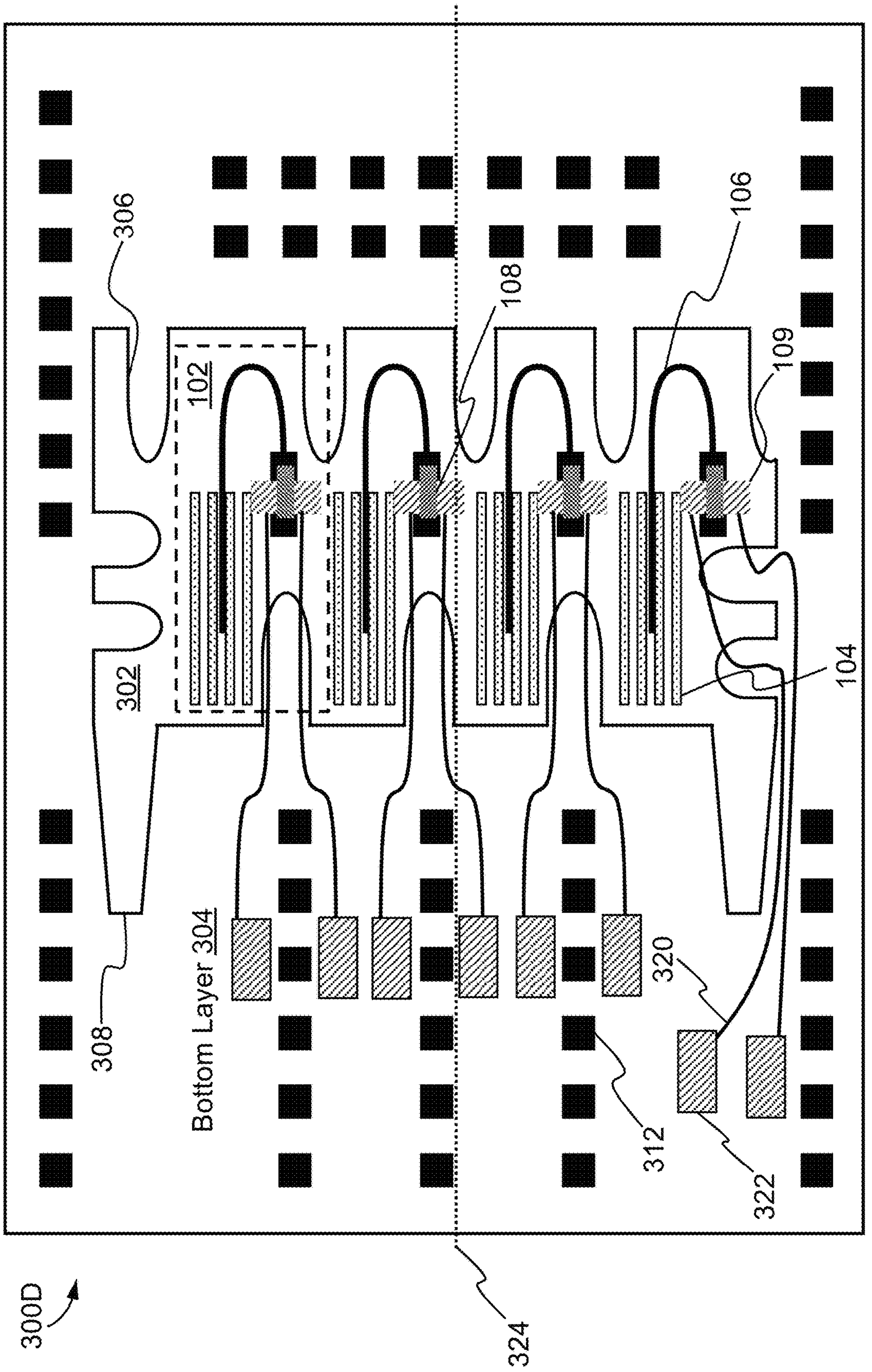
FIG. 3D is a schematic diagram of a multi-port optical monitoring companion chip 300D, as viewed from above.

FIG. 3D shows a multi-port optical monitoring companion chip 300D, as viewed from above. In this example, metallic connector layers 320 electrically connect metallic layers 109 to electrical contacts 322. Thus, each photodiode 108 is electrically connected to respective electrical contacts 322. A dashed line 324 denotes a cross-section (i.e., plane) formed out of the page for FIG. 3E.

Figure 3E:
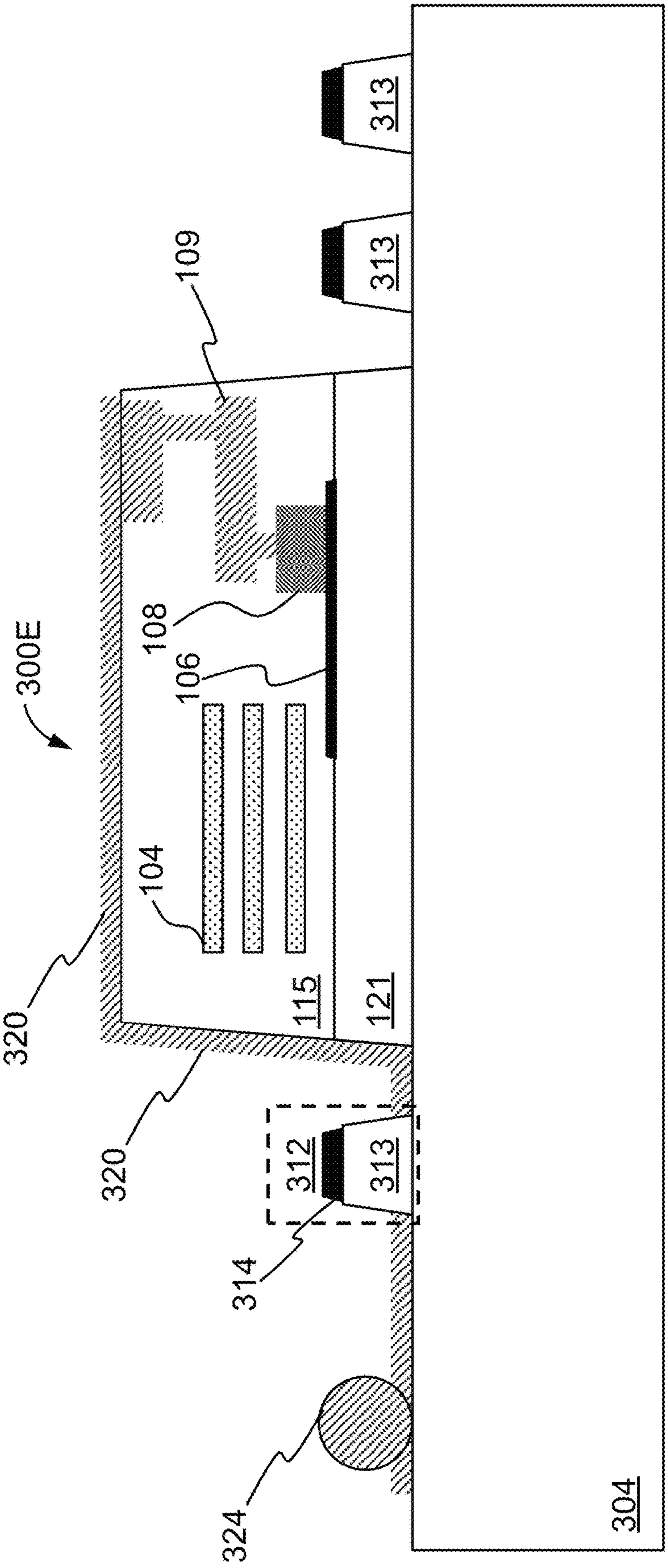
FIG. 3E is a schematic diagram of a cross-section of a multi-port optical monitoring companion chip.

FIG. 3E shows a cross-section of a multi-port optical monitoring companion chip 300E, as viewed through a plane denoted by the dashed line 324 of FIG. 3D. In this example, metallization layers 109 are electrically connected to the photodiode 108 and to metallic connector layers 320. The metallic connector layers 320 are electrically connected to a micro-bump 324 that is one possible type of an electrical contact 322 shown in FIG. 3D.

Figure 3F:
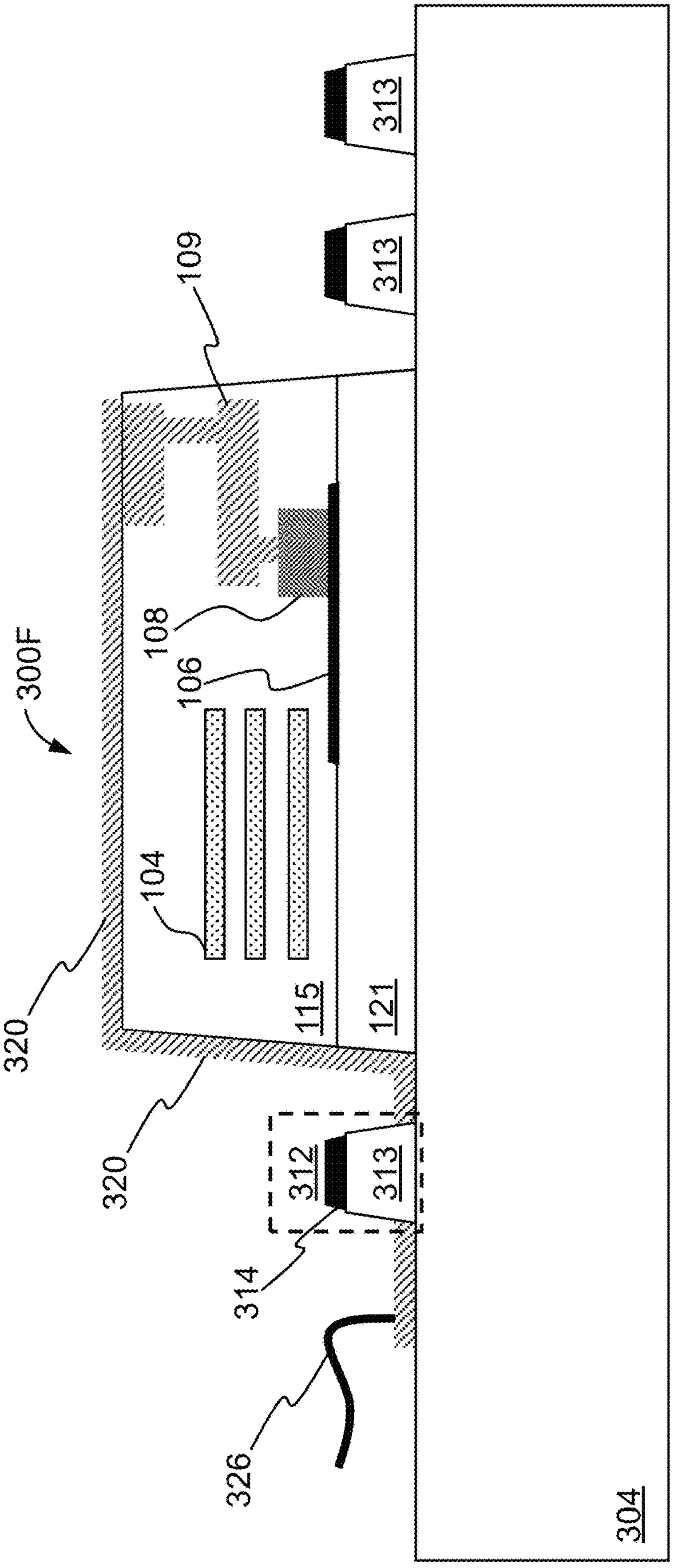
FIG. 3F is a schematic diagram of a cross-section of a multi-port optical monitoring companion chip.

FIG. 3F shows a cross-section of a multi-port optical monitoring companion chip 300F, as viewed through a plane denoted by the dashed line 324 of FIG. 3D. In this example, metallization layers 109 are electrically connected to the photodiode 108 and to metallic connector layers 320. The metallic connector layers 320 are electrically connected to a MEMS spring contact 326 that is one possible type of an electrical contact 322 shown in FIG. 3D.

Figure 4A:
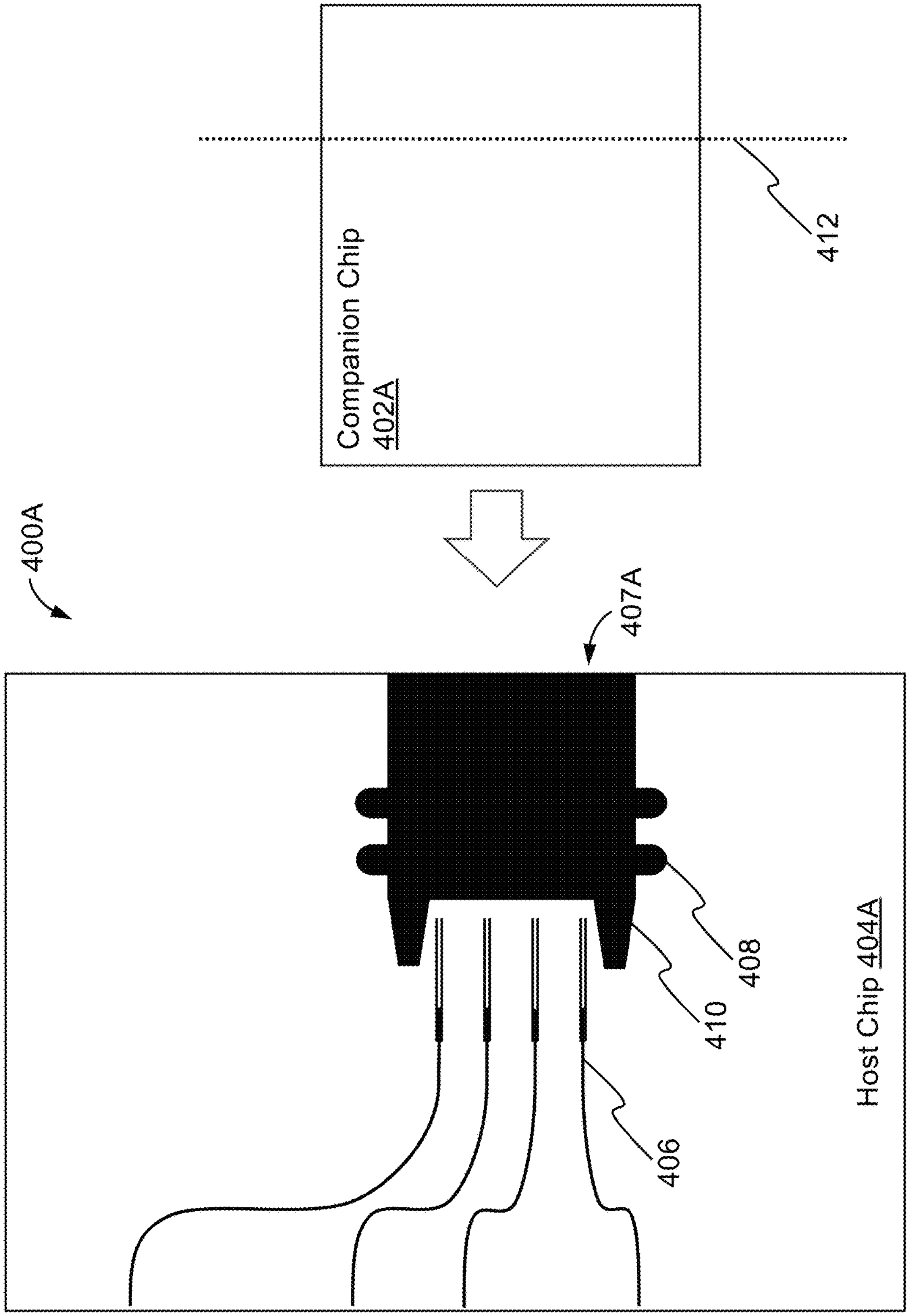
FIG. 4A is a schematic diagram of a co-packaging assembly process, as viewed from above.

FIG. 4A shows a co-packaging assembly process 400A, as viewed from above. A companion chip 402A is in the process of being adhered to a host chip 404A such that waveguides 406 on the host chip 404A align with waveguides (not shown) on the companion chip 402A. The host chip 404A comprises a main cavity 407A into which the companion chip 402A will be inserted. In this example, the main cavity 407A extends to the edge of the host chip 404A. The host chip 404A further comprises adhesive cavities 408, to allow for excess adhesive to overflow into, as well as alignment cavities 410. The alignment cavities may be designed so as to guide alignment structures of the companion chip 402A (e.g., alignment guides 308 of FIGS. 3A and 3B) into a well-controlled horizontal alignment with respect to the host chip 404A. A dashed line 412 denotes a cross-section (i.e., plane) formed out of the page for FIG. 4B.

Figure 4B:
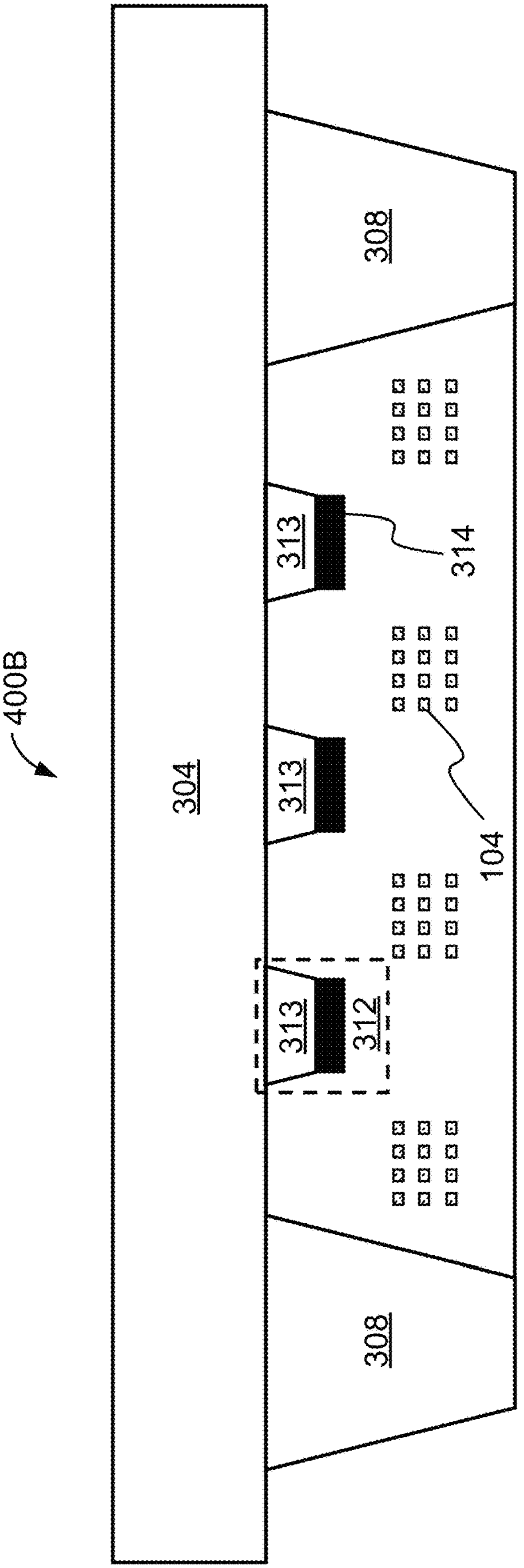
FIG. 4B is a schematic diagram of a cross-section of a companion chip.

FIG. 4B shows a cross-section, as viewed through a plane denoted by the dashed line 412 of FIG. 4A, of a companion chip 400B. The companion chip 400B has been "flipped" after the fabrication process so that it can be co-packaged with a host chip (not shown).

Figure 4C:
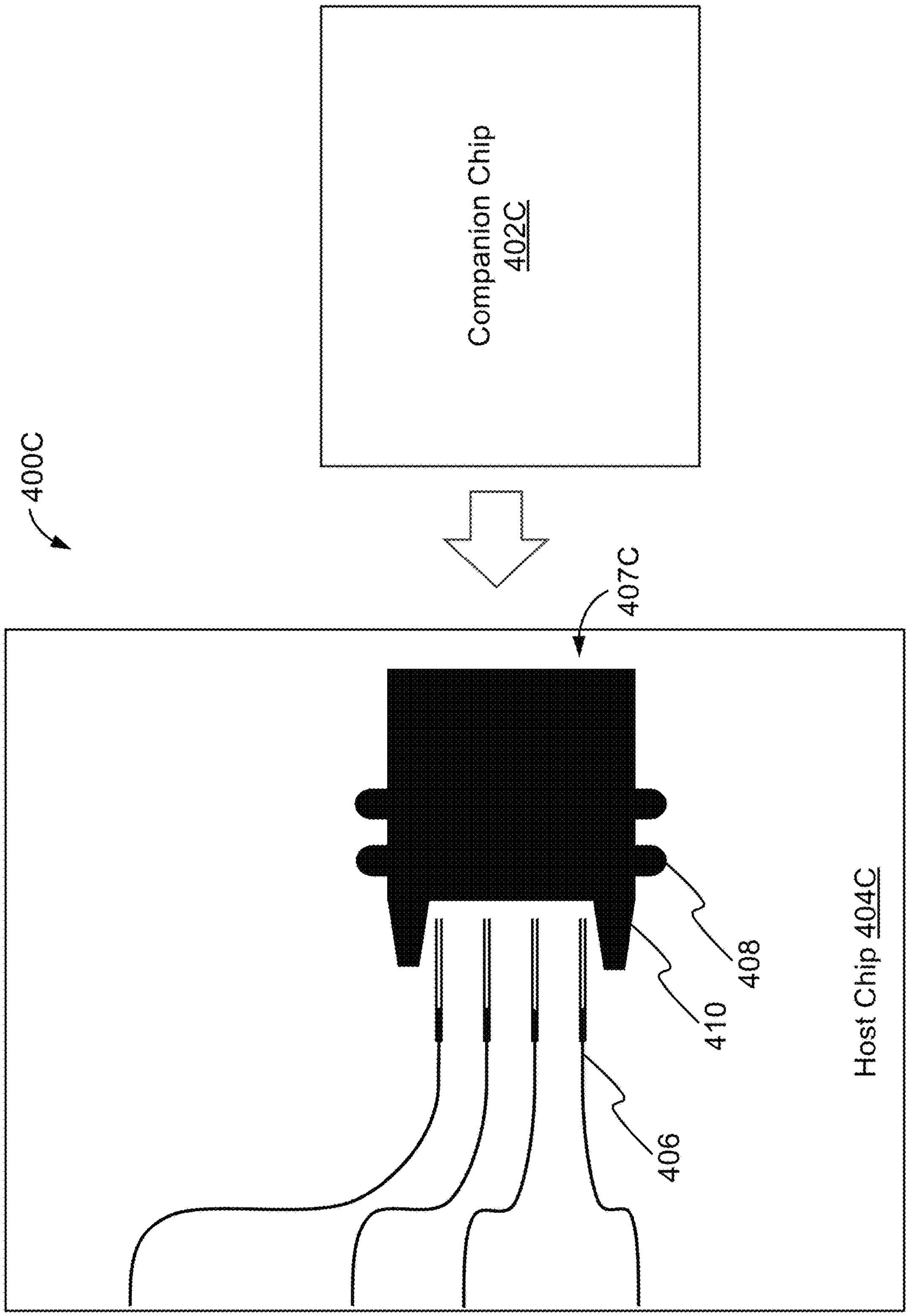
FIG. 4C is a schematic diagram of a co-packaging assembly process, as viewed from above.

FIG. 4C shows a co-packaging assembly process 400C, as viewed from above. A companion chip 402C is in the process of being adhered to a host chip 404C such that waveguides 406 on the host chip 404C align with waveguides (not shown) on the companion chip 402C. The host chip 404A comprises a main cavity 407C into which the companion chip 402C will be inserted. In this example, the main cavity 407C does not extend to the edge of the host chip 404C. Thus, the companion chip 402C may have alignment pedestals (e.g., alignment pedestals 312 of FIG. 3A) that can be adhered to the host chip 404C to the left and the right of the main cavity 407C.

Figure 4E:
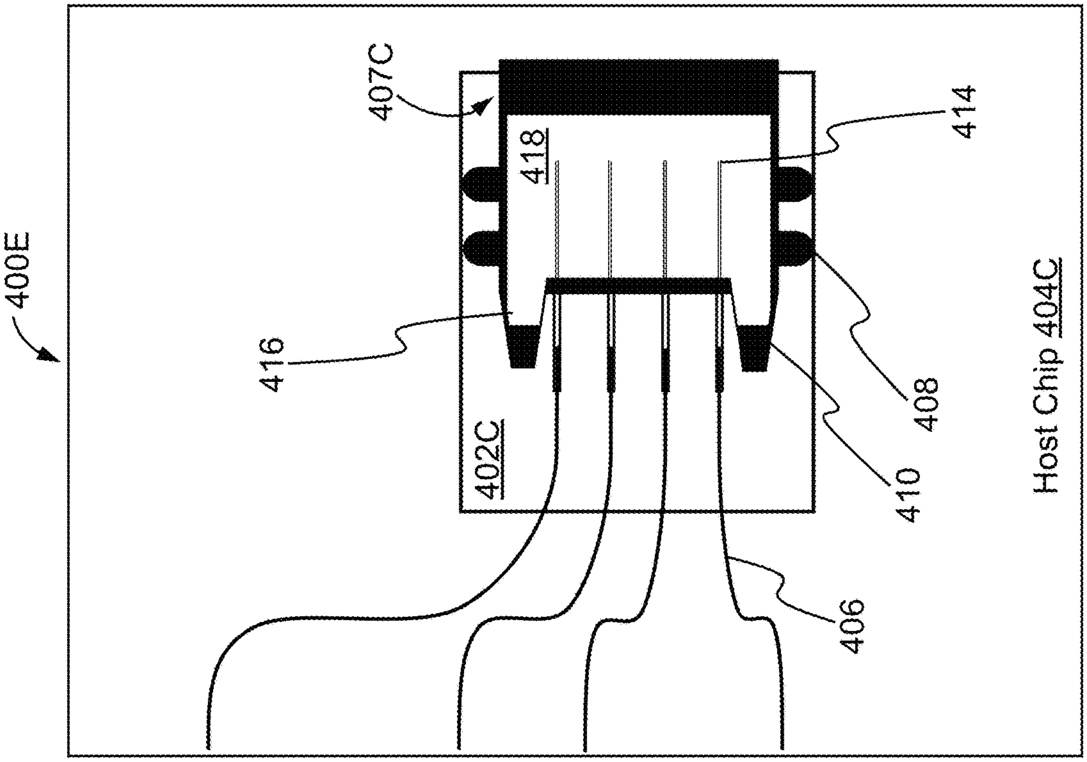
FIG. 4E is a schematic diagram of a co-packaging assembly process, as viewed from above.
Figure 4D:
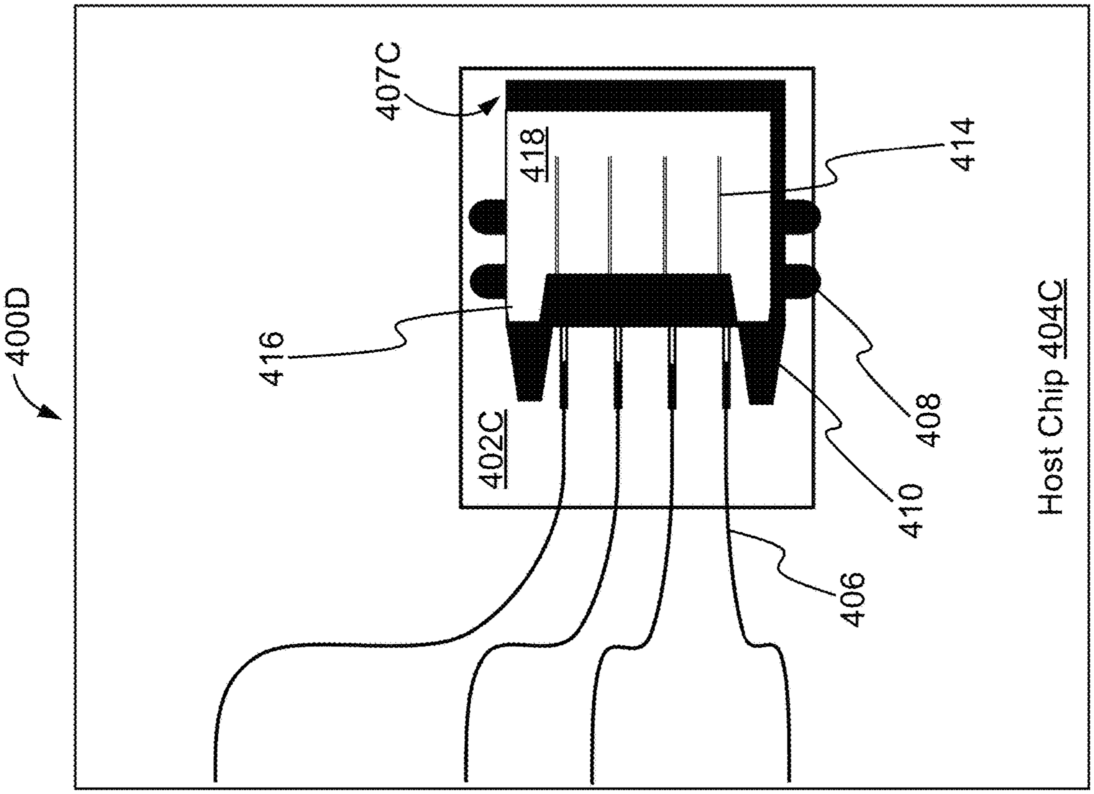
FIG. 4D is a schematic diagram of a co-packaging assembly process, as viewed from above.

FIG. 4D shows a co-packaging assembly process 400D, as viewed from above. A companion chip 402C is in the process of being adhered to a host chip 404C such that host waveguides 406 on the host chip 404C align with companion waveguides 414 on the companion chip 402C. The companion chip 402C comprises alignment structures 416, composed of oxide layers 418, that are not yet inserted into alignment cavities 410. The horizontal alignment between host waveguides 406 and companion waveguides 414 may be improved by inserting the alignment structures 416 into the alignment cavities 410 on the host chip 404C.

FIG. 4E shows a co-packaging assembly process 400E, as viewed from above. Compared to FIG. 4D, the horizontal alignment between host waveguides 406 and companion waveguides 414 has been improved by inserting the alignment structures 416 into alignment cavities 410 on the host chip 404C.

Figure 5A:
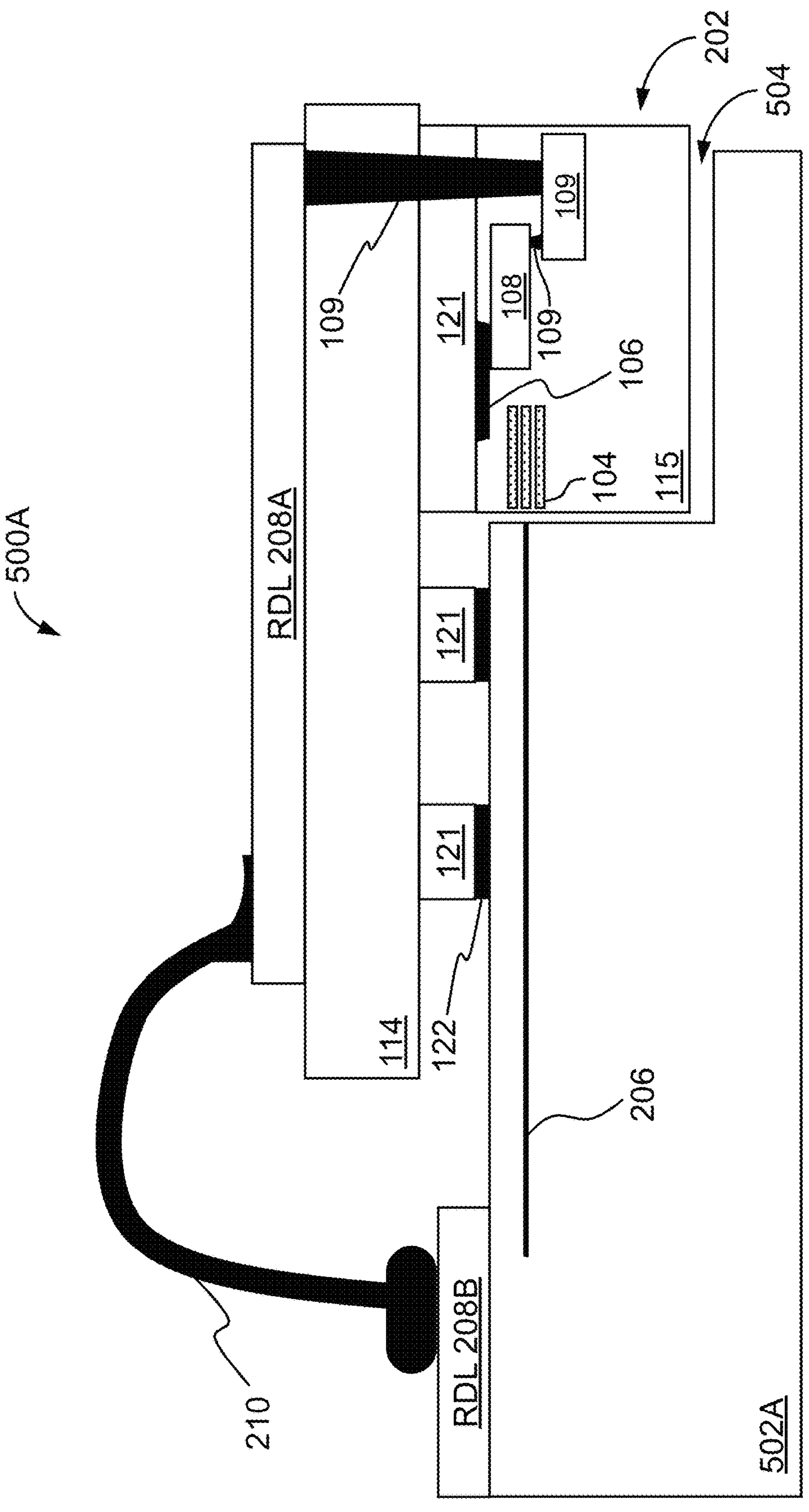
FIG. 5A is a schematic diagram of a cross-section, as viewed from the side, of a co-packaged photonic integrated circuit.

FIG. 5A shows a cross-section, as viewed from the side, of a co-packaged photonic integrated circuit 500A comprising (1) a multi-port optical monitoring companion chip 202 and (2) a host chip 502A. The host chip 502A comprises a partial cavity 504 into which the multi-port optical monitoring companion chip 202 is inserted.

Figure 5B:
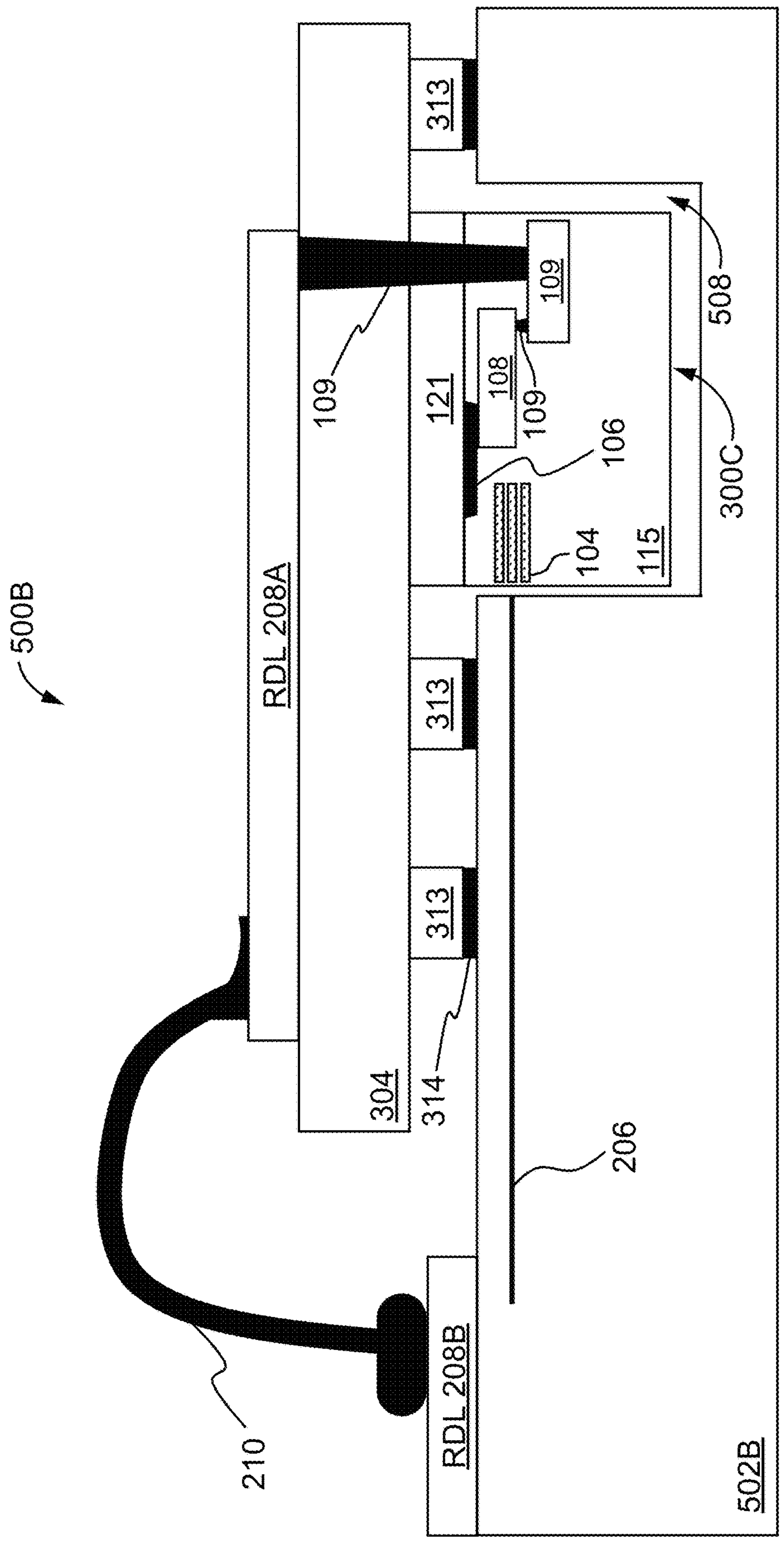
FIG. 5B is a schematic diagram of a cross-section, as viewed from the side, of a co-packaged photonic integrated circuit.

FIG. 5B shows a cross-section, as viewed from the side, of a co-packaged photonic integrated circuit 500B comprising (1) a companion chip 300C and (2) a host chip 502B. The host chip 502B comprises a cavity 508 into which the companion chip 300C is inserted.

Although FIGS. 5A and 5B show a direct optical coupling between a host and companion chip, in general, other optical coupling are also possible. For example, the host and companion chip may be evanescently optically coupled (e.g., similar to the evanescent optical coupling shown within the companion chip 300C between the SSC 104 and the waveguide 106).

Figure 6B:
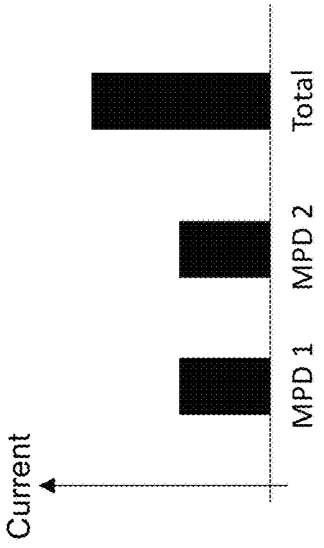
FIG. 6B is a prophetic plot of the electrical current generated by each of two photodiodes, and their sum.
Figure 6A:
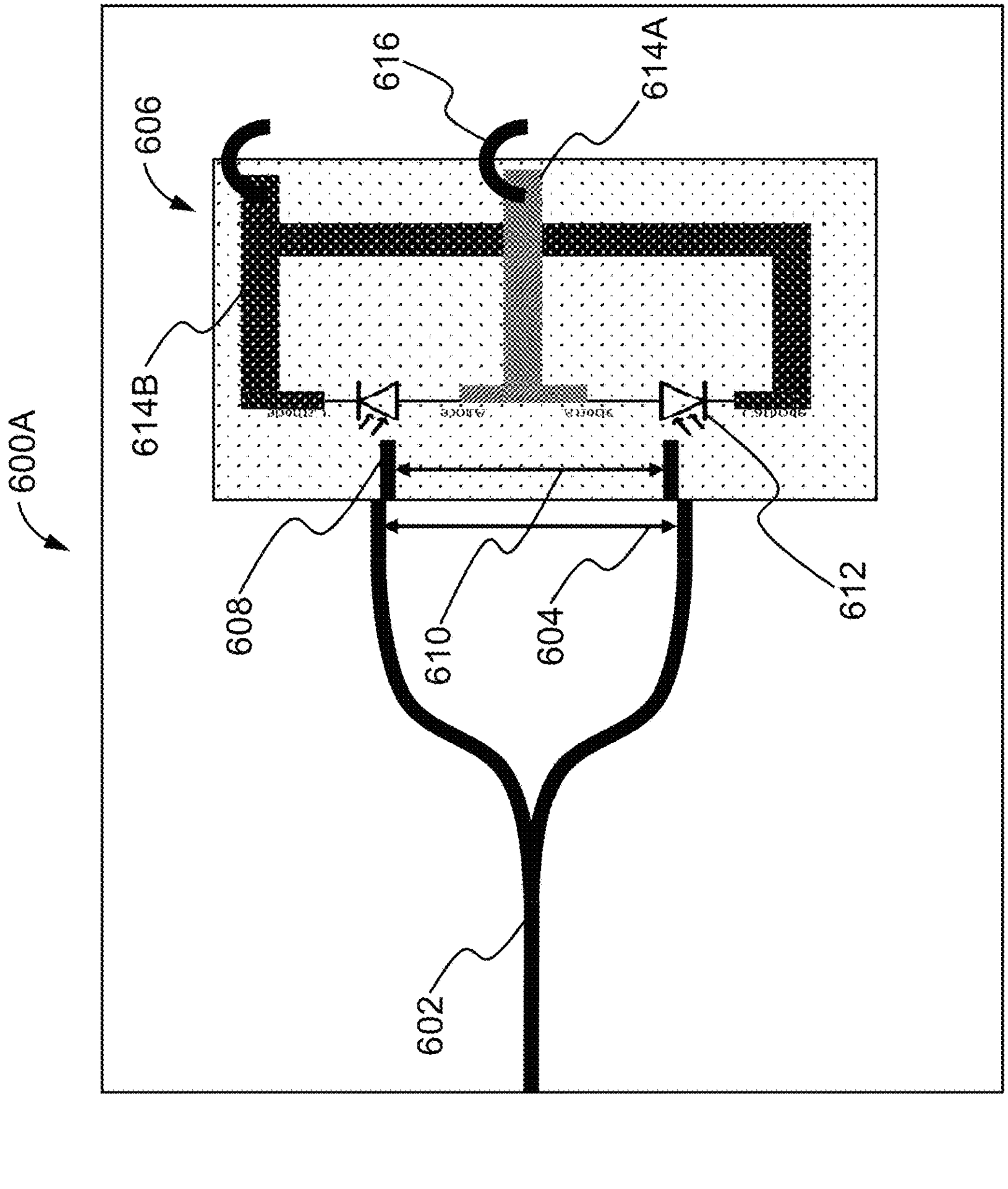
FIG. 6A is a schematic diagram of a waveguide integrated photodiode.

FIG. 6A shows a waveguide integrated photodiode 600A. An input waveguide 602 splits into two paths that are separated by a first pitch 604 at the interface of a photodiode package 606. The photodiode package 606 comprises two integrated waveguides 608 that are separated by a second pitch 610 that is smaller than the first pitch 604. The two integrated waveguides 608 are optically coupled to respective photodiodes 612. The anodes of the photodiodes 612 are electrically connected by a first metallic layer 614A, while the cathodes of the photodiodes 612 are electrically connected by a second metallic layer 614B. Off-photodiode electrical connections 616 transmit the electrical signals of the first metallic layer 614A and the second metallic layer 614B away from the photodiode package 606. In this example, the two integrated waveguides 608 have the same optical coupling efficiency since they are horizontally offset by the same amount from their respective portions of the input waveguide 602.

FIG. 6B shows a prophetic plot of the electrical current generated by each of the photodiodes 612 of FIG. 6A (MPD1, MPD2), and their sum (Total).

Figure 6D:
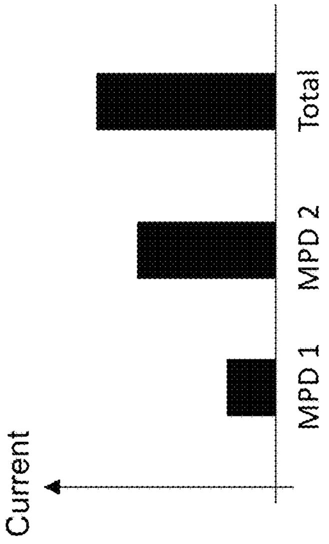
FIG. 6D is a prophetic plot of the electrical current generated by each of two photodiodes, and their sum.
Figure 6C:
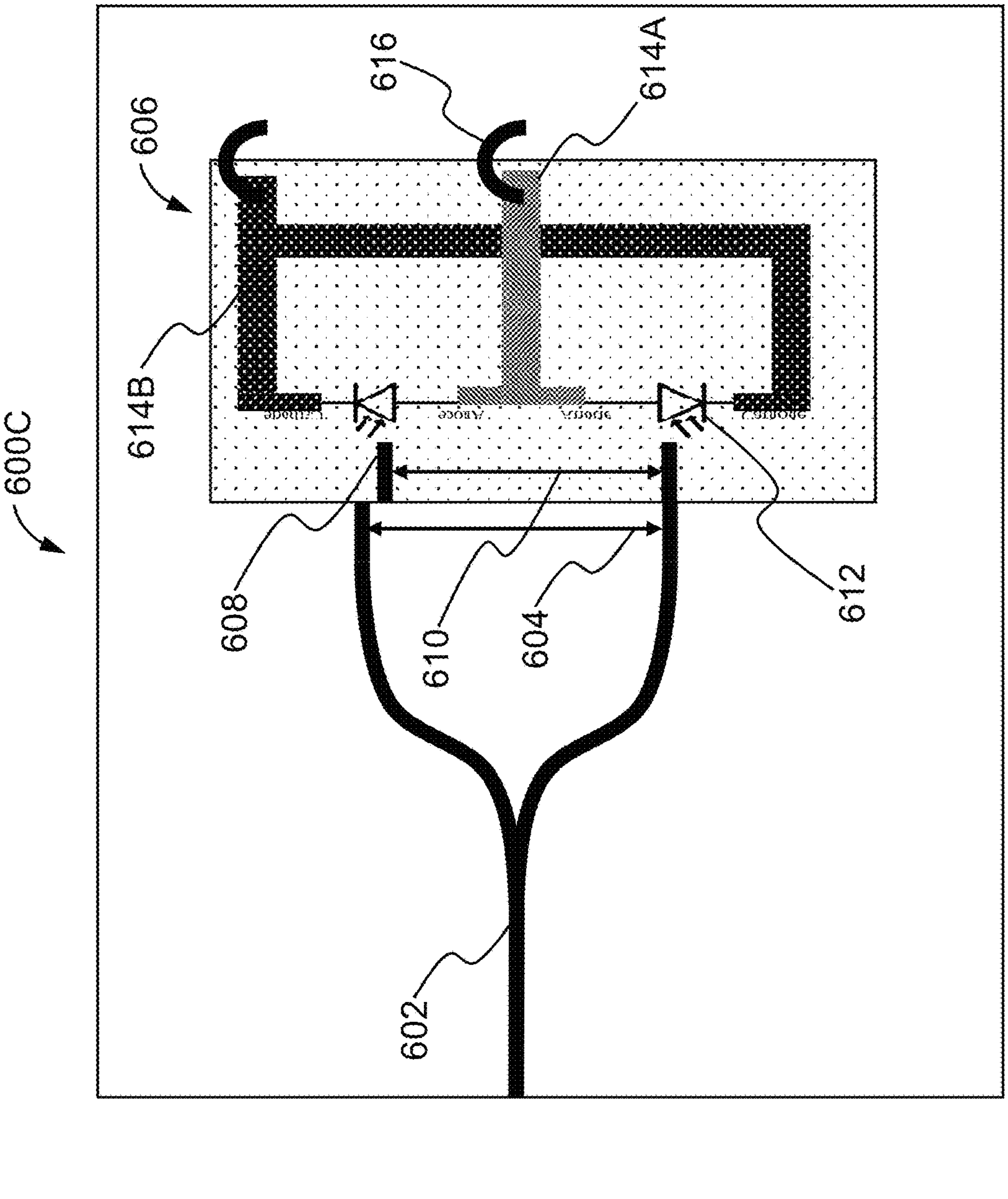
FIG. 6C is a schematic diagram of a waveguide integrated photodiode.

FIG. 6C shows a waveguide integrated photodiode 600A. In this example, two integrated waveguides 608 have different optical coupling efficiency since they are horizontally offset by different amounts from their respective portions of an input waveguide 602.

FIG. 6D shows a prophetic plot of the electrical current generated by each of the photodiodes 612 of FIG. 6C (MPD1, MPD2), and their sum (Total). The Total current of FIGS. 6B and 6D are similar because of the mismatch between the second pitch 610 from the first pitch 604. For example, if the first pitch 604 and the second pitch 610 were equal, then the Total current would only have a single maximum value that occurs when the first pitch 604 and the second pitch 610 have no horizontal offset. However, with a pitch mismatch, there are at least two maximum values that occur: one when a first of the integrated waveguides 608 overlaps a first portion of the input waveguide 602, and another when a second of the integrated waveguides 608 overlaps a second portion of the input waveguide 602.

Thus, vertical and horizontal alignment can be achieved by utilizing alignment pedestals in conjunction with a pitch mismatch between the pitch of a split waveguide and the pitch of waveguides integrated within a photodiode package.

In some examples, the companion chips disclosed herein replace an external discrete device (e.g., a photodiode), which can be bulky and occupy space on the die or package, and can require many assembly processes (e.g., active alignment, electrical connection, and use of adhesive). The optical coupling to the external discrete device may also be non-optimal.

In some examples, electro-optic modulators may utilize thin film lithium niobate (TFLN). TFLN and similar materials may lack photoresponsivity and may thus require free-space coupled external photodiodes to measure on-chip light. For example, a typical arrangement may be to assemble a InGaAs or GaAs free-space photodiode onto a ceramic carrier and then actively align it to the host chip. However, externally coupled devices can have poor optical isolation and may be prone to parasitic stray light collection (i.e., receiving undesired light). Optical cross talk can also be a major issue and can prevent photodiodes from being located very close together. The long path-lengths from the external photodiode to the on-chip optical signals can also limit the optical signal received at the photodiode.

While the disclosure has been described in connection with certain embodiments of an apparatus and a method, as summarized above, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus comprising:

a first photonic integrated circuit comprising a first optical element optically coupled to a first coupling region at an edge of the first photonic integrated circuit; and a second photonic integrated circuit, formed in part from a multilayer structure comprising (1) a bottom layer, (2) a top layer comprising a first material with a first index of refraction, and (3) a middle layer comprising a second material with a second index of refraction lower than the first index of refraction and having a first thickness between the bottom and top layers, the second photonic integrated circuit comprising a plurality of vertical alignment pedestals comprising a portion of the middle layer having the first thickness and attached to at least a portion of the bottom layer, a plurality of thinned regions, at least one of which is located between two of the plurality of vertical alignment pedestals, in which at least a portion of the middle layer is absent or has a thickness less than the first thickness, and a second optical element optically coupled to a second coupling region at an edge of the second photonic integrated circuit;

wherein two or more of the plurality of vertical alignment pedestals are adhered to the first photonic integrated circuit; and wherein the second optical element is optically coupled to one or more photodiode modules located in the second photonic integrated circuit, each photodiode module comprising one or more photodiodes.

2. The apparatus of claim 1, wherein the first and second coupling region are optically coupled and vertically offset from one another by less than 40 nanometers.

3. The apparatus of claim 1, wherein the first optical element comprises an optical waveguide, and the first coupling region comprises a portion of the optical waveguide that is in proximity to the edge of the first photonic integrated circuit.

4. The apparatus of claim 1, wherein the second optical element comprises an optical spot size converter, and the second coupling region comprises a portion of the optical spot size converter that is in proximity to the edge of the second photonic integrated circuit.

5. The apparatus of claim 1, wherein the second photonic integrated circuit further comprises a waveguide coupled to the second optical element, the waveguide being formed on a portion of the middle layer that has the first thickness.

6. The apparatus of claim 1, wherein at least one of the one or more photodiode modules comprise a first photodiode optically coupled to a third optical element and a second photodiode optically coupled to a fourth optical element, where the third optical element and the fourth optical element are separated by a first distance.

7. The apparatus of claim 6, wherein the first photodiode and the second photodiode are electrically connected in parallel.

8. The apparatus of claim 6, wherein the third optical element is optically coupled to a fifth optical element, and the fourth optical element is optically coupled to a sixth optical element, where the fifth optical element and the sixth optical element are separated by a second distance that is different from the first distance.

9. The apparatus of claim 8, wherein the fifth optical element and the sixth optical element are optically coupled to a seventh optical element, and where the seventh optical element is optically couple to the second optical element.

10. The apparatus of claim 1, wherein at least one of the one or more photodiode modules is electrically connected to a metal layer located under the bottom layer.

11. The apparatus of claim 1, wherein at least one of the one or more photodiode modules is electrically connected to a metal layer located on top of the top layer.

12. The apparatus of claim 1, wherein the first photonic integrated circuit and the second photonic integrated circuit are electrically connected.

13. The apparatus of claim 1, wherein the first photonic integrated circuit comprises a first set of tapered guiding structures and the second photonic integrated circuit comprises a second set of tapered guiding structures, and a portion of the second set of tapered guiding structures is located within the first set of tapered guiding structures.

14. The apparatus of claim 1, wherein the top layer comprises silicon, indium phosphide, thin film lithium niobate, or silicon nitride.

15. The apparatus of claim 1, wherein the middle layer comprises an oxide or a buried oxide.

16. A method comprising:

forming a first photonic integrated circuit comprising a first optical element optically coupled to a first coupling region at an edge of the first photonic integrated circuit; and forming a second photonic integrated circuit, including portions formed in part from a multilayer structure comprising (1) a bottom layer, (2) a top layer comprising a first material with a first index of refraction, and (3) a middle layer comprising a second material with a second index of refraction lower than the first index of refraction and having a first thickness between the bottom and top layers, the second photonic integrated circuit comprising a plurality of vertical alignment pedestals comprising a portion of the middle layer attached to at least a portion of the bottom layer, a plurality of thinned regions, at least one of which is located between two of the plurality of vertical alignment pedestals, in which at least a portion of the middle layer is absent or has a thickness less than the first thickness, wherein forming the plurality of thinned regions comprises selectively etching such that oxide is etched faster than silicon is etched, and a second optical element optically coupled to a second coupling region at an edge of the second photonic integrated circuit;

and adhering two or more of the plurality of vertical alignment pedestals to the first photonic integrated circuit;

wherein the second optical element is optically coupled to one or more photodiode modules located in the second photonic integrated circuit, each photodiode module comprising one or more photodiodes.

17. The method of claim 16, wherein forming the plurality of thinned regions comprises patterning a portion of the top layer to remove portions of the top layer that were over the plurality of thinned regions, and selectively etching such that oxide of the middle layer is etched faster than silicon of the top layer remaining on the plurality of vertical alignment pedestals is etched.

18. The method of claim 16, further comprising inserting a portion of a first set of tapered guiding structures of the second photonic integrated circuit into a second set of tapered guiding structures of the first photonic integrated circuit.

19. The method of claim 16, wherein the second photonic integrated circuit further comprises a waveguide coupled to the second optical element, the waveguide being formed on a portion of the middle layer that has the first thickness.

20. The method of claim 16, wherein the first photonic integrated circuit and the second photonic integrated circuit are electrically connected.

* * * * *